US012783699B2

(12) United States Patent
Kansara et al.

(10) Patent No.: US 12,783,699 B2
(45) Date of Patent: Nov. 3, 2026

(54) INTEGRATION OF TRAINING CONTENT PLATFORMS WITH TRAINING MANAGEMENT PLATFORMS

(71) Applicant: Honeywell International Inc., Charlotte, NC (US)

(72) Inventors: Jignesh Kansara, Mira-Bhayandar (IN); Rajendra Barsu Bharti, Lakhani (IN)

(73) Assignee: Honeywell International Inc., Charlotte, NC (US)

( * ) Notice: Subject to any disclaimer, the term of this patent is extended or adjusted under 35 U.S.C. 154(b) by 122 days.

(21) Appl. No.: 18/788,236

(22) Filed: Jul. 30, 2024

(65) Prior Publication Data

US 2026/0037650 A1 Feb. 5, 2026

(51) Int. Cl.

| | |
|---|---|
| ***G06F 21/62*** | (2013.01) |
| ***G06F 21/56*** | (2013.01) |
| ***H04L 9/40*** | (2022.01) |

(52) U.S. Cl.

CPC .............. *G06F 21/62* (2013.01); *G06F 21/56* (2013.01); *H04L 63/10* (2013.01); *H04L 63/14* (2013.01)

(58) Field of Classification Search

CPC ..... G06F 21/56–568; G06F 21/60–645; H04L 63/04–0492; H04L 63/08–0892; H04L 63/10–108; H04L 63/14–1491

See application file for complete search history.

(56) References Cited

U.S. PATENT DOCUMENTS

| | | | | |
|---|---|---|---|---|
| 10,949,760 | B1 * | 3/2021 | Kritzinger | G06F 16/9035 |
| 11,838,300 | B1 * | 12/2023 | Vashisht | H04L 63/1466 |
| 2025/0166105 | A1 * | 5/2025 | Lambert | G06Q 50/20 |

OTHER PUBLICATIONS

Beuran, Razvan, et al. "Supporting cybersecurity education and training via LMS integration: CyLMS." Education and Information Technologies 24.6 (2019): 3619-3643. (Year: 2019).*

Krumova, Milena, and Ashish Kataria. "Education cybersecurity: Learning management system, data and tools." Proceedings of the 16th International Conference on Theory and Practice of Electronic Governance. 2023. (Year: 2023).*

(Continued)

*Primary Examiner* — Madhuri R Herzog

(74) *Attorney, Agent, or Firm* — Alston & Bird LLP

(57) ABSTRACT

Techniques for integrating a training content platform with a training management platform (TMP) are disclosed. A system includes a file broker and a secret managing unit. The file broker acts as an intermediary between the training content platform and the TMP. The training content platform manages a Sharable Content Object Reference Model-compliant training content. The file broker receives a request, from a tenant of the TMP, to upload the training content to the training content platform. The file broker authenticates the request and in response to a successful authentication, obtains the training content from the tenant. The training content is scanned for malware and in response to an absence of the malware in the training content, an access key from the secret managing unit is fetched. The training content is then sent to the training content platform for uploading the training content thereof using the access key.

20 Claims, 10 Drawing Sheets

(56) References Cited

OTHER PUBLICATIONS

LearnBrite, Exploring the Features and Benefits of SCORM Cloud, Jul. 27, 2024, 10 pages. https://www2.learnbrite.com/scorm-cloud/.
Rustici Software, SCORM Cloud API, 6 pages. https://rusticisoftware.com/products/scorm-cloud/api/?utm_source=google&utm_medium=natural_search.
Zscaler, What Is a Cloud Access Security Broker (CASB)?, 9 pages. https://www.zscaler.com/resources/security-terms-glossary/what-is-cloud-access-security-broker.
Learnsmarter Apps Ltd, Learnsmarter SCORM Pack, 5 pages. https://appexchange.salesforce.com/appxListingDetail?listingId=4646455a-b446-4a9e-87e1-350f9e2e28c9&tab=e.
MapleLMS, How Important is it to Have a SCORM Compliant LMS? 13 pages. https://www.maplelms.com/blog/how-important-is-it-to-have-a-scorm-compliant-lms.
Cloud Creations, SCORM Cloud Integration Package, 3 pages. https://www.cloudcreations.com/integration/scorm-cloud/.
What is Azure Service Bus? 1153 pages. https://learn.microsoft.com/en-us/azure/service-bus-messaging/service-bus-messaging-overview.

* cited by examiner

INTEGRATION OF TRAINING CONTENT PLATFORMS WITH TRAINING MANAGEMENT PLATFORMS

BACKGROUND

Organizations train employees for various purposes. For instance, organizations train their employees to upgrade skill sets of the employees on a regular basis. In another scenario, the organizations train the employees with codes and ethics of the company. Further, in another scenario, the organizations train the employees on various recognized phishing attacks that can cause serious breaches of data including confidential information, such as intellectual property, financial information, organizational information and other important information. Similarly, some organizations may facilitate training for students on different subjects, such as science, history, geography, maths, and the like. The content for the training may be provided through a training management system (TMS). The TMS is an application or software that delivers and manages delivery of training content. The TMS provides each user with a specific user account onto which the user can log on and access the training content. The TMS manages registration and log-ins of the users, manages training catalogs, and prepares reports corresponding to the progress of the user. There are technical standards available for creating and/or integrating training content into the TMS. An example of a technical standard includes shareable content object reference model (SCORM). Integration of the training content into the TMS is controlled using technical guidelines outlined by SCORM.

SCORM is an Extensible Markup Language (XML)-based framework that facilitates development of reusable training content within a common framework. SCORM uses Shareable Content Objects (SCOs) to deliver the training content to a mobile device, such as a cell phone, tablet, laptop, desktop, and the like. The SCO includes a collection of one or more data, such as a web page, a text document, an audio file, a video file, an image file, a graphic file, and the like. One or more SCOs are packaged together as the training content, which is delivered to the TMS. According to the SCORM, Run-Time Environment (RTE), communication between the TMS and the SCO may occur through an application programming interface (API). The TMS initiates launch of the SCO and implement the API. The SCO finds and uses the API to communicate with the TMS. The SCO makes JavaScript calls to the API as a user interacts with SCORM-compliant training content during runtime of the training content through the TMS.

SUMMARY

In the present subject matter, a system for integrating a training content platform with a training management platform may include a file broker and a secret managing unit. The training content platform may be, for example, Rustici engine. The training management platform may be, for example, Salesforce training management platform. The file broker may act as an intermediary between the training content platform and the training management platform. The training content platform may manage a training content that is Sharable Content Object Reference Model (SCORM) compliant. The training management platform may provide access to the training content to a plurality of tenants. The secret managing unit may store access keys for the training content platform corresponding to each of the plurality of tenants. The file broker may receive a request from a tenant of the training management platform. The request may be indicative of uploading of the training content to the training content platform. The file broker may authenticate the request from the tenant of the training management platform.

In this regard, in an example, the system may include a keycloak unit to store identity information corresponding to each of the plurality of tenants of the training management platform. Accordingly, to authenticate the request, the file broker may determine whether the tenant that has raised the request is an authorized tenant of the training management platform based on the identity information corresponding to each of the plurality of tenants of the training management platform stored in the keycloak unit. Further, in response to the determination that the tenant that has raised the request is an authorized tenant of the training management platform, the file broker may obtain the training content from the tenant of the training management platform. On the other hand, in response to the determination that the tenant that has raised the request is an unauthorized tenant of the training management platform, the file broker may refrain from obtaining the training content from the training management platform and transmit a message to the tenant of the training management platform. The message may be indicative of failure of authentication of the request from the tenant of the training management platform.

In addition, in an example, the system may include a connections management unit to maintain multi-tenant configuration for managing connection of each of the plurality of tenants of the training management platform with the training content platform. The file broker may obtain an authentication token for authenticating the request from the tenant of the training management platform from the connections management unit.

Further, in response to a successful authentication of the request, the file broker may obtain the training content from the tenant of the training management platform. In this regard, the file broker may send a pre-signed Uniform Resource Locator (URL) to the tenant of the training management platform for secure uploading of the training content. The file broker may obtain the training content on the pre-signed URL from the tenant of the training management platform.

The file broker may scan the training content for malware upon obtaining the training content from the training management platform. In response to an absence of the malware in the training content, the file broker may fetch an access key for the training content platform corresponding to the tenant from the secret managing unit. Then, the file broker may send the training content to the training content platform using the access key for uploading the training content thereof. On the other hand, in response to a presence of malware in the training content, the file broker may refrain from fetching the access key for the training content platform corresponding to the tenant from the secret managing unit and may update a database corresponding to the file broker with a status message. The status message may be indicative of presence of the malware in the training content.

In an example, a method for integrating a training content platform with a training management platform may include transmitting a request to a file broker. The training content platform may be, for example, Rustici engine and the training management platform may be, for example, Salesforce training management platform. The request may be transmitted by a tenant of a plurality of tenants of the training management platform. The request may be indicative of uploading of a training content to the training content platform. The training content platform may manage the training content that is SCORM-compliant. The training management platform may provide access to the training content to the plurality of tenants. The file broker may act as an intermediary between the training content platform and the training management platform.

In response to receipt of the request from the tenant, the method includes authenticating, by the file broker, the request from the tenant of the training management platform. Further, in response to a successful authentication of the request, the method may include receiving an acknowledgement by the tenant of the training management platform. The acknowledgement may be indicative of the successful authentication of the request and may be received from the file broker.

In response to the receipt of the acknowledgement, the method may include sending, by the tenant of the training management platform, the training content to be uploaded to the training content platform. The training content may be sent to the file broker. Upon receiving the training content from the training management platform, the method may include determining, by the file broker, if the training content has malware. Upon the determination of absence of the malware in the training content, the method may include transmitting, by a secret managing unit, an access key for the training content platform corresponding to the tenant. The access key may be transmitted to the file broker. The secret managing unit may store access keys for the training content platform corresponding to each of the plurality of tenants. The method may include receiving, by the training content platform from the file broker, the training content. The file broker may use the access key for sending the training content to the training content platform.

In an example, the method may include sending a message enquiring status of upload of the training content to the training content platform. The message may be sent by a tenant of the training management platform. The method may include authenticating the message from the tenant of the training management platform by the file broker. Further, the method may include obtaining the status of upload of the training content to the training content platform in response to a successful authentication. The status of the upload may be obtained by the file broker from the database corresponding to the file broker. The method may include receiving the status of upload of the training content to the training content platform by the tenant of the training management platform. The status of the upload may be received from the file broker. On the other hand, in response to a failure of the authentication of the message from the tenant of the training management platform, the method may include refraining, by the file broker, from obtaining the status of upload of the training content to the training content platform.

In an example, a non-transitory computer-readable medium including instructions for integrating a training content platform with a training management platform. The instructions are executable by a processing resource to receive, by a file broker, a request from a tenant of a plurality of tenants of the training management platform. The request may be indicative of uploading of a training content to the training content platform. The training content platform may manage the training content that is SCORM compliant. The training content platform may be a Rustici engine. The training management platform may provide access to the training content to the plurality of tenants. The training management platform may be a Salesforce training management platform. The file broker may act as an intermediary between the training content platform and the training management platform. The instructions are executable by the processing resource to authenticate, by the file broker, the request from the tenant of the training management platform and receive, by the tenant of the training management platform, a pre-signed Uniform Resource Locator (URL) from the file broker for secure uploading of the training content in response to a successful authentication of the request. The instructions are executable by the processing resource to upload, by the tenant of the training management platform, the training content on the pre-signed URL and scan, by the file broker, the training content for malware. The instructions are executable by the processing resource to fetch, from a secret managing unit, an access key for the training content platform corresponding to the tenant in response to an absence of the malware in the training content. The instructions are executable by the processing resource to send, by the file broker, the training content to the training content platform using the access key for uploading the training content thereof. Further, the instructions are executable by the processing resource to transmit, by the training content platform to the file broker, an acknowledgement indicative of receipt of the training content by the training content platform. The instructions are executable by the processing resource to update, by the training content platform, a status of the uploading of the training content in a database corresponding to the file broker. The status may be indicative of the receipt of the training content platform.

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
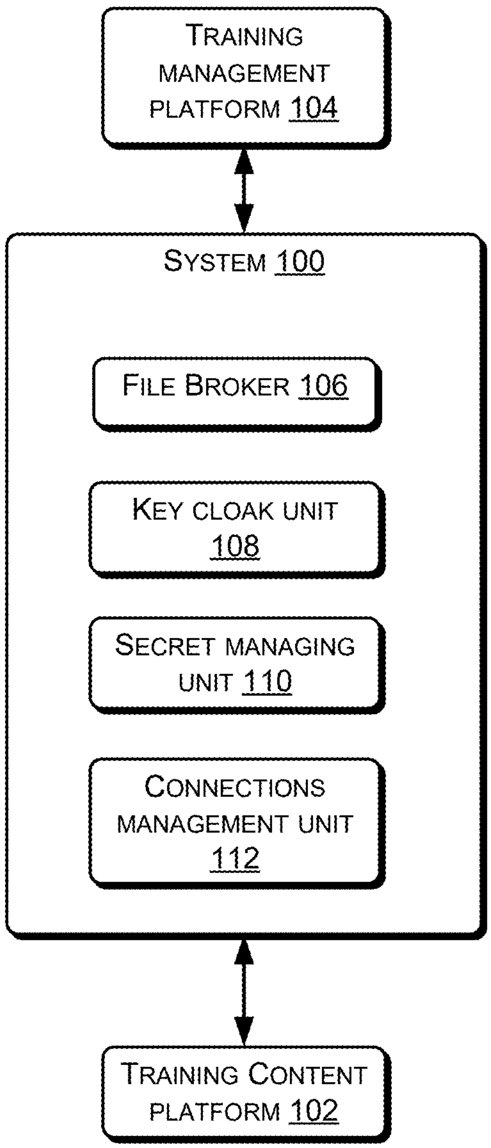
FIG. 1 illustrates a system for integration of a training content platform with a training management platform, according to an example implementation of the present subject matter.

Generally, organizations provide training content to employees for various purposes, such as to upgrade skill sets of the employees, to enhance awareness of the employees with codes and ethics of the organizations, to train the employees about recognized phishing attacks, and the like. In some scenarios, organizations provide training content to students on different subjects, such as science, history, geography, maths, and the like. The content for the training may be provided through a Training Management Platform (TMP) through which a user may login to a specific user account to access the training content. The TMP may be hosted on a separate cloud server. In some scenarios, the training content on the TMP is created in conformance with a technical standard SCORM, which defines how the training content has to be designed. The SCORM-compliant training content tracks progress and activities of each user, and the like, irrespective of cloud-service platform from which the SCORM-compliant training content is being hosted. In other words, even if the training content is ported from one TMP to another TMP, the compliance of the training content with SCORM enables to load and track progress of each user, track activities of each user, and the like, without each user having to start over the training content again.

The training content may be hosted using Rustici software, that is SCORM compliant, which is referred to as Rustici engine. The Rustici engine may be hosted on a private cloud server and may have to be integrated with the TMP. The TMP may be provided by, for example, Salesforce. Hereinafter, the TMP may be referred to as Salesforce TMP. The integration of the Salesforce TMP with the Rustici engine may be done directly using administrator keys of Rustici engine or keys that will have to be shared with each of the users of the Salesforce TMP. Generally, the Rustici engine provides standard integration patterns, such as Rustici Application Programming Interface (APIs). The Salesforce TMP may use Rustici APIs and interact with the Rustici engine to access the training content. However, the integration of the Salesforce TMP with the Rustici engine may pose direct challenges in managing credentials of users.

Further, the integration of the Salesforce TMP with the Rustici engine poses data security risks. For instance, as mentioned above, access keys corresponding to the Rustici engine for accessing the training content may have to be shared with the users. In other words, for each of the users, authentication may have to be done by Rustici engine. However, sharing of the access keys corresponding to the Rustici engine may enable the users to manipulate the data according to user privileges that is provided for a particular view of the training content corresponding to the access keys shared with the users. Therefore, this may pose data security challenges. Further, conventionally, the integration of the Salesforce TMP with the Rustici engine may pose operational risks. The process of integration becomes cumbersome especially in a multi-tenant TMP. In the multi-tenant TMP, a single TMP instance is shared by multiple users who have their own self-contained workspace within that TMP. This includes unique design elements, layouts, privileges, and features for each group. In other words, multi-tenant TMP includes each user operating independently of one another on a single instance of the TMP. The users share a common infrastructure and the same database layers while having separate data storage. Accordingly, in a multi-tenant TMP, access keys to the Rustici engine corresponding to each of the plurality of tenants will have to be generated and distributed. The process of generating and sharing the access keys to each user is cumbersome and difficult. The sharing of the access keys for each of the plurality of users would also pose a data security risk, especially if the sharing is done over e-mail, File Transfer Protocol service, or the like. In addition, the integration of the Salesforce TMP with the Rustici engine application may need manual effort from the DevOps during onboarding of each of the users.

In addition, conventionally, if a training content is to be uploaded to the Rustici engine from the salesforce TMP, such as by an administrator, upon the authentication by the Rustici engine, the file may be uploaded to the Rustici engine. However, if the training content includes malware, the uploading of the training content may pose data security risks to the Rustici engine. In other words, the Rustici engine may be vulnerable to the loss of data, such as the training content, and sensitive information, theft of identity information of the users, and the like.

The present subject matter facilitates integration of the SCORM-compliant training content platform with a training management platform. The SCORM-compliant training content platform may be, for example, Rustici engine and the training management platform may be, for example, provided by the Salesforce training management platform. Hereinafter, the training content platform will be explained with reference to and will be referred to as Rustici engine. The training content management platform will be explained with reference to Salesforce Training management platform and will be referred to as Salesforce platform.

A system for integration of the Rustici engine and the Salesforce platform may include a file broker. The file broker may act as an intermediary between the Rustici engine and the Salesforce platform. In an example, the Salesforce platform may be hosted on a first cloud server and the Rustici engine and the system may be hosted on a second cloud server. In an example, the first cloud server may be provided by Salesforce. The second cloud server may be provided by Amazon Web Services.

A SCORM-compliant training content, such as videos, web pages, images, text documents, graphic files, and the like, may have to be uploaded to the Rustici engine from the Salesforce platform for a user to access the training content through a web browser or a software application, or the like. In this regard, the file broker may receive a request from a tenant of the Salesforce platform. The request may be indicative of uploading of the training content to the Rustici engine.

The file broker may authenticate the request for uploading of the training content from the Salesforce platform by verifying the identity of the tenant of the Salesforce platform. In this regard, the system may include a keycloak unit to store identity information corresponding to each of the plurality of tenants of the training management platform. Accordingly, to authenticate the request from the tenant, the file broker may determine whether the tenant that has raised the request is an authorized tenant of the training management platform based on the identity information corresponding to each of the plurality of tenants of the training management platform stored in the keycloak unit. If it is determined that the tenant is an authorized tenant of the Salesforce platform, the file broker may send an acknowledgement message indicating successful authentication of the request.

In an example, to facilitate the authentication of the request from the Salesforce platform, the system may include a connections managing unit. The connections managing unit may maintain multi-tenant configuration for managing connection of each of the plurality of tenants of the Salesforce platform with the Rustici engine. The file broker may obtain, from the connections management unit, an authentication token for authenticating the request from the tenant of the Salesforce platform.

If it is determined that the authentication has failed, the file broker may transmit a message to the tenant of the Salesforce platform indicative of failure of the authentication. On the other hand, in response to a successful authentication of the request from the tenant of the Salesforce platform, an Application Programming Interface (API) gateway may trigger a request to the file broker to send a pre-signed Uniform Resource Locator (URL) to the tenant of the Salesforce platform in response to sending of the acknowledgement message by the file broker. The pre-signed URL may enable secure uploading of the training content to the Rustici engine.

In response to the triggering of the request, the file broker may transmit the pre-signed URL to the tenant of the Salesforce platform. The tenant of the Salesforce platform may upload the training content on the pre-signed URL and may transmit to the file broker.

The file broker may scan the training content for malware upon obtaining the training content from the Salesforce platform. If, based on the scanning, it is determined that the training content does not have malware, the file broker may fetch an access key for the Rustici engine corresponding to the tenant of the Salesforce platform. In this regard, the system may include a secret managing unit for storing access keys for the Rustici engine corresponding to each of the plurality of tenants of the Salesforce platform. Accordingly, the file broker may fetch the access key from the secret managing unit.

Further, the file broker may send the training content to the Rustici engine for uploading the training content using the access key fetched from the secret managing unit. Upon receiving the training content, the Rustici engine may send an acknowledgement message to the file broker indicative of the receipt of the training content. Further, the Rustici engine may update status of the uploading of the training content in a database corresponding to the file broker. The status may be indicative of the receipt of the training content.

On the other hand, if, based on the scanning, it is determined that the training content has malware, the file broker may update the database corresponding to the file broker with a status message indicative of the presence of malware in the training content. Further, the file broker may refrain from uploading the training content to the Rustici engine and may not fetch the access key from the secret managing unit of the system for uploading the training content to the Rustici engine. Further, the Rustici engine may update the database corresponding to the Rustici engine regarding the presence of malware in the training content.

In an example, a tenant of the Salesforce platform may request for status of the uploading of the training content onto the Rustici engine. In this regard, the tenant of the Salesforce platform may send a message to the file broker enquiring about status of upload of the training content. The file broker may authenticate the message from the tenant of the Salesforce platform. In response to a successful authentication, the file broker may request and obtain the status of the upload from the database corresponding to the file broker. Upon obtaining the status, the file broker may transmit the status of upload to the Salesforce platform.

On the other hand, if the authentication of the request from the tenant of the Salesforce platform has failed, the file broker may refrain from obtaining the status of upload from the database corresponding to the file broker. Further, the file broker may transmit a message indicating failure of authentication to the tenant of the Salesforce platform.

In the present subject matter, to mitigate the security risk and DevOps intervention, the file broker is provided as an intermediary between the Salesforce TMP and the Rustici engine. As mentioned earlier, the present subject matter uses the connections managing unit and the keycloak unit to authenticate and authorize Salesforce TMP interaction with the file broker. Therefore, the present subject matter eliminates direct call to the Rustici engine, which would have required sharing the access keys with each of the users. The file broker fetches the access keys from the secret managing unit when interacting with Rustici engine. Therefore, the present subject matter secures access to the access keys only with the file broker. Accordingly, the present subject matter mitigates data security risks by not sharing access keys with each user and operational risks. The present subject matter ensures secure authentication and authorization taking advantage of existing components. Further, the present subject matter reduces manual onboarding steps for onboarding of the users and additional load on DevOps during onboarding of users. In the present subject matter, the file broker scans the training content uploaded for malware and does not upload the training content to the Rustici engine if there is a malware found in the training content. Accordingly, the present subject matter eliminates data security risks caused to the Rustici engine due to presence of malware. Therefore, the present subject matter eliminates any loss of data, such as the training content, and sensitive information, theft of identity information of the users, and the like.

The present subject matter is further described with reference to FIGS. 1-7*b*. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates a system 100 for integration of a training content platform 102 with a training management platform 104, according to an example implementation of the present subject matter. The system 100 may enable integration of the training content platform 102 with the training management platform (TMP) 104. The training content platform 102 may be, for example, Rustici engine that is to support Sharable Content Object Reference Model (SCORM)-compliant training content and to manage the training content. The training content may be, for example, video files, image files, audio files, graphic files, text files, and the like. The training content platform 102 may be, for example, Rustici-engine. Hereinafter, the training content platform 102 will be explained with reference to Rustici-engine. In an example, the training content platform 102 may be hosted on a separate cloud server. The training content platform 102 may be hosted on a Rustici-based cloud server. In another example, the training content platform 102 may be hosted on an Amazon Web Services (AWS) cloud server.

The TMP 104 may provide access to the training content to a plurality of tenants. The TMP 104 may be, for example, Salesforce TMP. Hereinafter, the TMP will be explained with reference to Salesforce TMP. In an example, the TMP 104 may be hosted on a separate cloud server. For instance, the TMP 104 may be hosted on a Salesforce-based cloud server.

The training content platform 102 and the TMP 104 may have to be integrated for enabling creation, uploading, modification, and the like, of the training content to the training content platform 102 and to enable access of the training content from the training content platform 102 through the TMP 104. In this regard, the system 100 may facilitate integration of the training content platform 102 with the TMP 104. The system 100 may include a microprocessor, a microcomputer, a microcontroller, a digital signal processor, a central processing unit, a state machine, a logic circuitry, or a device that manipulates signals based on operational instructions. In an example, the system 100 may hosted on a cloud server. In particular, the system 100 may be hosted on the cloud server that hosts the training content platform 102.

The system 100 may include a file broker 106, a keycloak unit 108, a secret managing unit 110, and a connections management unit 112. The keycloak unit 108 may store identity information corresponding to each of the plurality of tenants of the TMP 104. The identity information may include Identity and Access Management (IAM) Credentials, such as password, unique Identification number corresponding to each of the tenants of the TMP 104, roles corresponding to each tenant, such as an administrator role, and the like, along with access allowed for the tenant, and the like. When the tenant of the TMP 104 is on-boarded, the identity information may be created by the TMP 104, which may be transmitted to the keycloak unit 108 for storing the identity information. The identity information stored in the keycloak unit 108 may be used for authentication of the tenant of the TMP 104, as will be explained later.

Further, in an example, when each tenant of the TMP 104 is on-boarded onto the TMP 104, the training content platform 102 may have to be accessed corresponding to a request from the tenant. The request may be, for example, to upload a training content to the training content platform 102, to request a status of the upload of the training content to the training content platform 102, to modify the training content in the training content platform 102, and the like. Accordingly, to enable a secure access of the training content platform 102, the training content platform 102 may generate an access key corresponding to each of the plurality of tenants of the TMP 104 upon the on-boarding of each of the plurality of tenants. The training content platform 102 may transmit the access keys corresponding to each of the plurality of tenants of the TMP 104 to the secret managing unit 110. The secret managing unit 110 may store access keys for the training content platform 102 corresponding to each of the plurality of tenants of the TMP 104.

The connection management unit 112 may maintain multi-tenant configuration for managing connection for each of the plurality of tenants of the TMP 104 with the training content platform 102. In other words, the connection management unit 112 may provide an authentication token for connection of each of the tenants of the TMP 104 with the training content platform 102.

The file broker 106 may act as an intermediary between the training content platform 102 and the TMP 104 and perform various activities corresponding to the integration of the training content platform 102 with the TMP 104. Assume that a tenant of the TMP 104 may have to upload a training content to the training content platform 102. In this regard, the tenant of the TMP 104 may transmit a request for uploading the training content to the training content platform 102. The request may be received and processed by the file broker 106. The file broker 106 may facilitate authentication of the request from the tenant of the TMP 104 to ensure that the tenant raising the request is an authorized tenant. For instance, for the authentication of the request, the file broker 106 may use the identity information from the keycloak unit 108 and the authentication token from the connections management unit 112.

If the authentication fails, the file broker 106 may notify the tenant of the TMP 104 that has raised the request and may not obtain the training content from the tenant. On the contrary, in response to a successful authentication of the request from the tenant of the TMP 104, the file broker 106 may obtain the training content from the tenant. For instance, the file broker 106 may transmit a pre-signed Uniform Resource Locator (URL) to the tenant for the secure uploading of the training content. The pre-signed URL may use security credentials and may grant time-limited permission to upload or download the training content. The tenant may upload the training content in the pre-signed URL and may transmit the training content to the file broker 106.

In some scenarios, the training content that is to be uploaded by the tenant may include malware. Accordingly, the uploading of the training content with malware may lead to compromise in data security of the training content platform 102 and the TMP 104. Therefore, to prevent the training content being uploaded with the malware, upon receiving the training content, the file broker 106 may scan the training content for virus or malware.

Further, in response to the presence of the malware, the file broker 106 may notify a database corresponding to the file broker 106 about the presence of the malware in the training content and the file broker 106 may not transmit the training content to the training content platform 102. On the other hand, in response to the absence of the malware, the file broker 106 may fetch an access key for the training content platform 102 from the secret managing unit 110 corresponding to the tenant of the TMP 104. The file broker 106 may send the training content to the training content platform 102 using the access key for uploading the training content thereof. Upon the uploading of the training content, the training content may be accessed by a tenant of the TMP 104 through the TMP 104 by using a browser, a software application, or the like.

Figure 2:
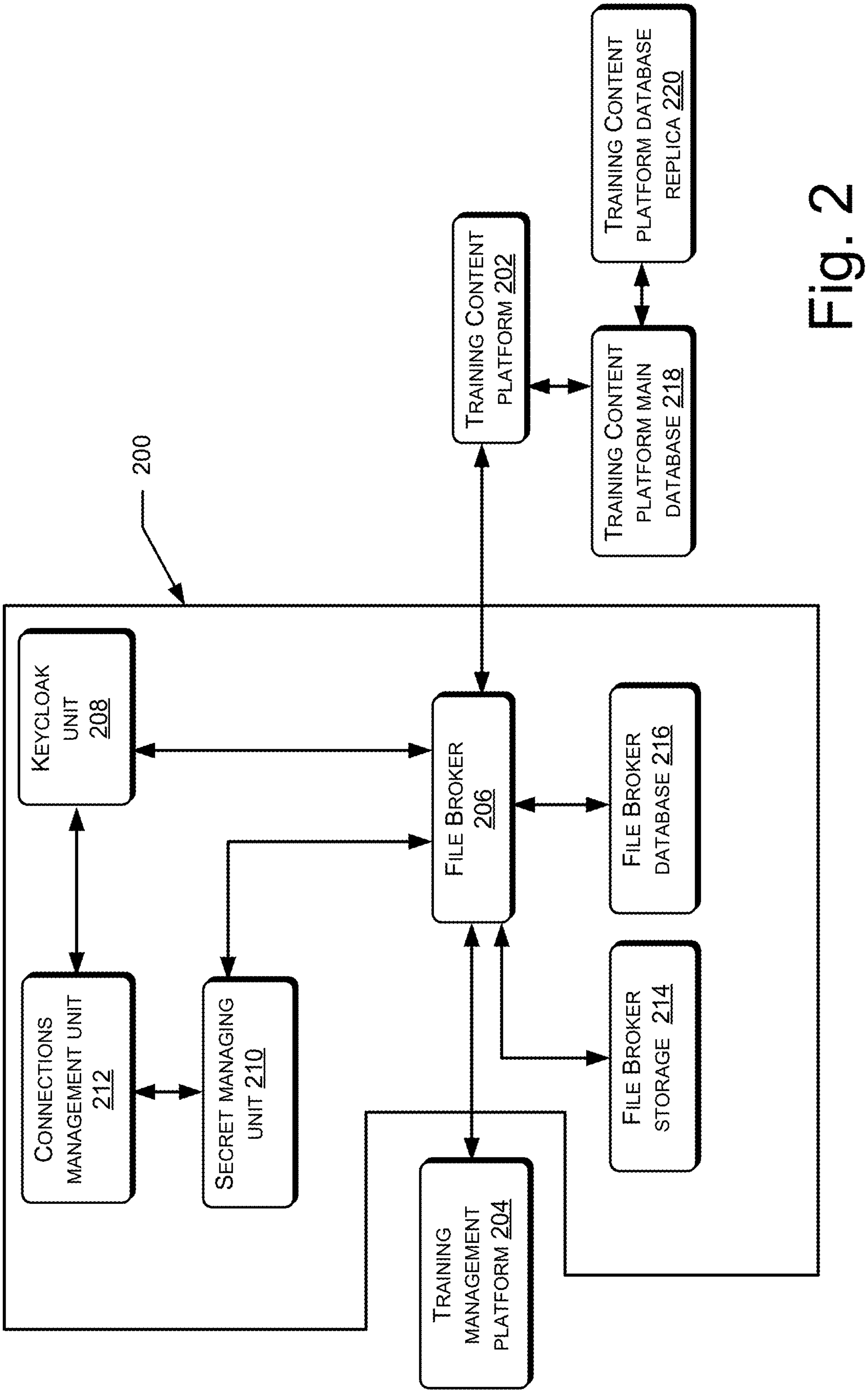
FIG. 2 illustrates integration of a training content platform with a training management platform, according to an example implementation of the present subject matter.

FIG. 2 illustrates integration of a training content platform 202 with a TMP 204, according to an example implementation of the present subject matter. The training content platform 202 and the TMP 204 may have to be integrated for enabling creation, uploading, modification, and the like, of a training content to the training content platform 202 and to enable access of the training content from the training content platform 202 through the TMP 204. In this regard, the system 200 may facilitate integration of the training content platform 202 with the TMP 204.

In an example, the training content platform 202 may be, for example, Rustici engine that is to support Sharable Content Object Reference Model (SCORM)-compliant training content and to manage the training content. The training content may be, for example, video files, image files, audio files, graphic files, text files, and the like. Hereinafter, the training content platform 202 will be explained with reference to Rustici-engine. In an example, the training content platform 202 may be hosted on a separate cloud server. The training content platform 202 may be hosted on a Rustici-based cloud server. In another example, the training content platform 202 may be hosted on an AWS cloud server. The training content platform 202 may correspond to the training content platform 102. In an example, the training content platform 202 may include a training content platform main database 218 and a training content platform database replica 220 for storing of the data corresponding to the training content platform 202.

The TMP 204 may provide access to the training content to a plurality of tenants. The TMP 204 may be, for example, Salesforce TMP. Hereinafter, the TMP will be explained with reference to Salesforce TMP. In an example, the TMP 204 may be hosted on a separate cloud server. For instance, the TMP 104 may be hosted on a Salesforce-based cloud server. The TMP 204 may, for example, correspond to the TMP 104.

The system 200 may include a microprocessor, a microcomputer, a microcontroller, a digital signal processor, a central processing unit, a state machine, a logic circuitry, or a device that manipulates signals based on operational instructions. In an example, the system 200 may hosted on a cloud server. In particular, the system 200 may be hosted on the cloud server that hosts the training content platform 202. Particularly, if the training content platform 202 is hosted on the AWS cloud server, the system 200 may be hosted on the same AWS cloud server. However, in another example, the system 200 may be hosted on the AWS cloud server and the training content platform 102 may be hosted on a different cloud server, such as the Rustici-based cloud server.

The system 200 may, for example, correspond to the system 100. Accordingly, similar to the system 100, the system 200 may include a file broker 206, a keycloak unit 208, a secret managing unit 210, and a connections management unit 212. In other words, the file broker 206 may correspond to the file broker 106, the keycloak unit 208 may correspond to the keycloak unit 108, the secret managing unit 210 may correspond to the secret managing unit 110, and the connections management unit 212 may correspond to the connections management unit 112.

The keycloak unit 208 may store identity information corresponding to each of the plurality of tenants of the TMP 204. Further, the secret managing unit 210 may store access keys for the training content platform 202 corresponding to each of the plurality of tenants of the TMP 204. The connection management unit 212 may maintain multi-tenant configuration for managing connection for each of the plurality of tenants of the TMP 204 with the training content platform 202. In other words, the connection management unit 212 may provide an authentication token for connection of each of the tenants of the TMP 204 with the training content platform 202.

The file broker 206 may act as an intermediary between the training content platform 202 and the TMP 204 and perform various activities corresponding to the integration of the training content platform 102 with the TMP 104. The system 200 may include a file broker storage 214 and a file broker database 216. The file broker storage 214 and the file broker database 216 may store information corresponding to the file broker 206 and may be connected with the file broker 206. The file broker storage 214 may store the pre-signed URL uploaded with the training content, which is received from the tenant of the TMP 104. The file broker database 216 may store status corresponding to malware in the training content and may facilitate fetching the status of presence or absence of the malware in the training content. Further, the file broker database 216 may also store status of the upload of the training content to the training content platform 202 and may facilitate fetching the status of upload of the training content. In an example, the file broker storage 214 may be Amazon S3. The file broker database 216 may be, for example, Amazon dynamoDB.

During operation, the tenant of the TMP 204 may transmit a request for uploading the training content to the training content platform 202. The request may be transmitted through an Application Programming Interface (API) Gateway (not shown in FIG. 2) to an authorizer (not shown in FIG. 2) corresponding to the file broker 206. The authorizer may be a lambda service-based authorizer. Hereinafter, the authorizer may be referred to as the lambda authorizer. The lambda service is a serverless computing service that executes functions and manages underlying computing resources. For instance, the lambda service corresponding to the file broker 206 may execute functions and manage the file broker 206. The lambda service may be, for example, AWS Lambda service. The lambda authorizer corresponding to the file broker 206 may facilitate authentication of the request from the tenant of the TMP 204 by using the identity information from the keycloak unit 208 and the authentication token from the connections management unit 212.

If the authentication fails, the lambda authorizer corresponding to the file broker 206 may notify the tenant of the TMP 204, which has raised the request, regarding failure of the authentication. The notification may be done through the API gateway. Further, the file broker 206 may not obtain the training content from the tenant. On the contrary, in response to a successful authentication of the request from the tenant of the TMP 204, the Lambda Authorizer may notify the API gateway regarding the successful authentication. The API gateway may trigger the AWS Lambda service of the file broker 206 for a pre-signed URL. The pre-signed URL may use security credentials and may grant time-limited permission to upload or download the training content. The AWS Lambda service of the file broker 206 may transmit the pre-signed URL to the tenant of the TMP 204. The tenant may upload the training content in the pre-signed URL and transmit to the file broker 206. Specifically, the training content uploaded on the pre-signed URL may be stored in the file broker storage 214.

In some scenarios, the training content that is to be uploaded by the tenant may include malware. Accordingly, the uploading of the training content with malware may compromise data security of the training content platform 202 and the TMP 204. Therefore, to prevent the training content being uploaded with the malware, upon receiving the training content, the file broker 206 may scan the training content for virus or malware. In particular, the file broker storage 214 may trigger the AWS Lambda service of the file broker 206 to initiate the scan. The function, such as AWS Farget/EC2, corresponding to the file broker 206 may scan the training content and may return a result of the scanning of the training content to the AWS Lambda service corresponding to the file broker 206. The result of the scanning may include presence of malware or an absence of malware in the training content. If the result indicates absence of malware in the training content, the AWS Lambda service may transmit the result to a messaging queue service, such as an AWS Simple Queue Service (SQS), which may trigger the AWS Lambda service to send the training content to the training content platform 202.

On the contrary, if the result of the scanning indicates the presence of the malware, the file broker 206 may update a status about the presence of the malware in the training content and the file broker 206 may not transmit the training content to the training content platform 202. For instance, the AWS Eargate/EC2 may transmit the result of the scanning to the AWS Lambda service, which may update status of the result of the scanning in the file broker database 216.

In response to the absence of the virus and/or malware, the file broker 206 may fetch an access key for the training content platform 202 from the secret managing unit 210 corresponding to the tenant of the TMP 204. The file broker

106 may send the training content to the training content platform 102 using the access key for uploading the training content thereof. The AWS Lambda service of the file broker 206 may receive an acknowledgment from the training content platform 202 in response to a successful uploading of the training content to the training content platform 202. The AWS Lambda service may update status of the upload of the training content in the file broker database 216.

In an example, a tenant of the TMP 204 may transmit a message enquiring a status of the uploading of the training content to the training content platform 202 through the API gateway. The Lambda authorizer of the file broker 206 may authenticate the message from the tenant. In response to successful authentication, the API gateway may trigger the AWS Lambda service to get the status of the uploading of the training content to the training content platform 202. The AWS Lambda service may receive the status of the uploading of the training content from the file broker database 216, which may be transmitted to the tenant of the TMP 204.

On the other hand, in response to a failure of the authentication of the message from the tenant, the Lambda authorizer may send a status message indicative of failure of the authentication to the tenant of the TMP 204 through the API gateway.

Figure 3:
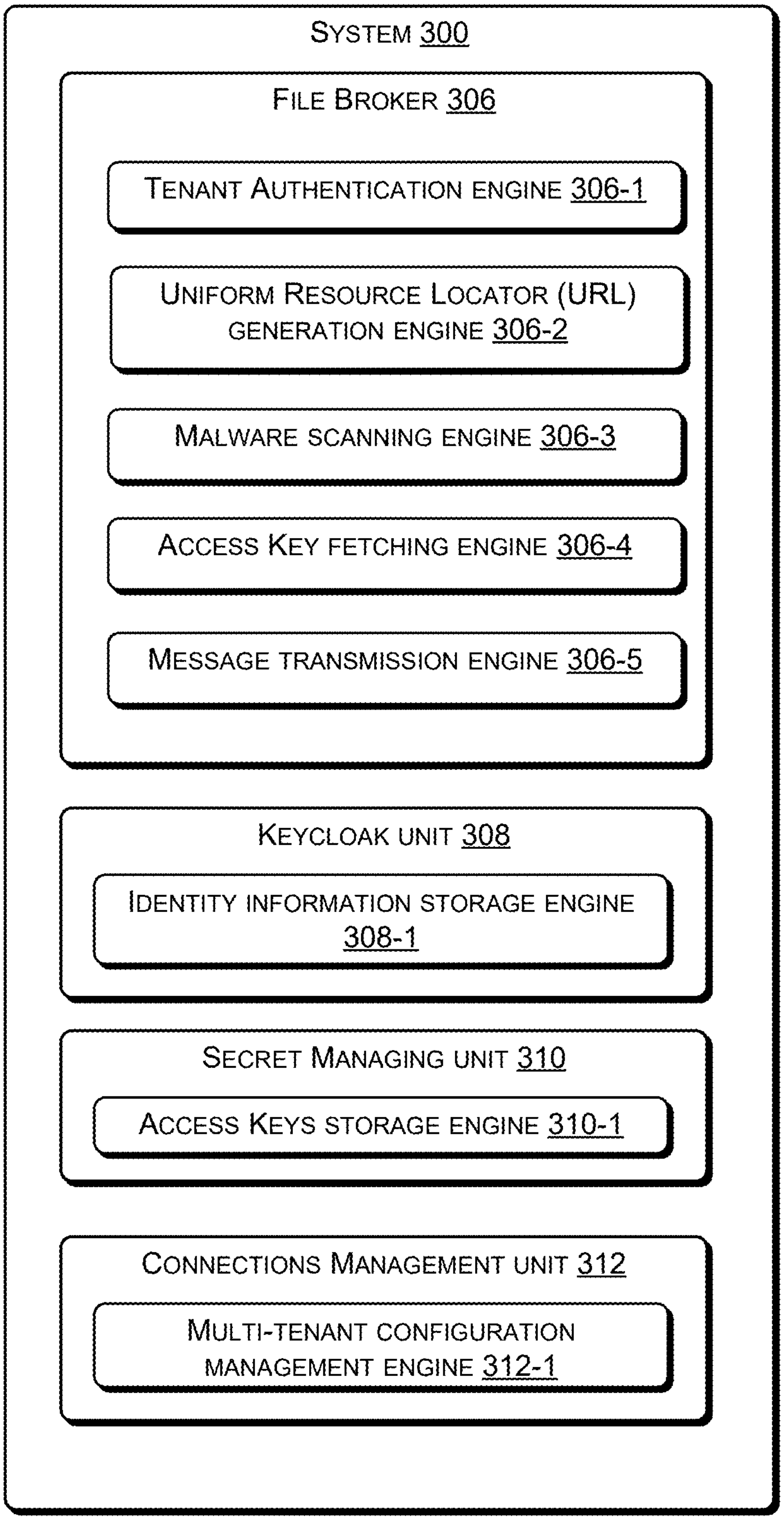
FIG. 3 illustrates a system for integration of a training content platform with a training management platform, according to an example implementation of the present subject matter.

FIG. 3 illustrates a system 300 for integration of a training content platform with a TMP, according to an example implementation of the present subject matter. The training content platform may correspond to the training content platform 102 or the training content platform 202. The TMP may correspond to the TMP 104 or the TMP 204. The system 300 may correspond to the system 100 or the system 200. The system 300 may include a file broker 306, a keycloak unit 308, a secret managing unit 310, and a connections management unit 312. The file broker 306 may correspond to the file broker 106 or the file broker 206. The keycloak unit 308 may correspond to the keycloak unit 108 or the keycloak unit 208. The secret managing unit 310 may correspond to the secret managing unit 110 or the secret managing unit 210. The connections management unit 312 may correspond to the connections management unit 112 or the connections management unit 212.

The file broker 306 may be or may be part of a computing device that has processing capabilities, such as a server, a desktop, a laptop, a tablet, a mobile phone, or the like. For instance, the file broker 306 may include, for example, a microprocessor, a microcomputer, a microcontroller, a digital signal processor, a central processing unit, a state machine, a logic circuitry, or a device that manipulates signals based on operational instructions. Among other capabilities, the processing unit (not shown in FIG. 3) may fetch and execute computer-readable instructions stored in a memory (not shown in FIG. 3), such as a volatile memory or a non-volatile memory, of the computing device.

The file broker 306 can include a processing unit (not shown in FIG. 3) to run at least one operating system and other applications and services. The device can also include an interface (not shown in FIG. 3) and a memory (not shown in FIG. 3).

The processing unit, amongst other capabilities, may be configured to fetch and execute computer-readable instructions stored in the memory. The processing unit may be implemented as one or more microprocessors, microcomputers, microcontrollers, digital signal processors, central processing units, state machines, logic circuitries, and/or any devices that manipulate signals based on operational instructions. The functions of the various elements shown in the figure, including any functional blocks labelled as "processing unit", may be provided through the use of dedicated hardware as well as hardware capable of executing machine readable instructions.

When provided by the processing unit, the functions may be provided by a single dedicated processor, by a single shared processor, or by a plurality of individual processors, some of which may be shared. Moreover, explicit use of the term "processing unit" should not be construed to refer exclusively to hardware capable of executing machine readable instructions, and may implicitly include, without limitation, digital signal processor (DSP) hardware, network processor, application specific integrated circuit (ASIC), field programmable gate array (FPGA), read only memory (ROM) for storing machine readable instructions, random access memory (RAM), non-volatile storage. Other hardware, conventional and/or custom, may also be included.

The interface may include a variety of machine-readable instructions-based interfaces and hardware interfaces that allow the cloud communication device to interact with different entities, such as the processing unit, and the data (not shown in FIG. 3). Further, the interface may enable the components of the file broker 306 to communicate with other cloud servers, web servers, and external repositories. The interface may facilitate multiple communications within a wide variety of networks and protocol types, including wireless networks, wireless Local Area Network (WLAN), RAN, satellite-based network, and the like.

The memory may be coupled to the processing unit and may, among other capabilities, provide data and instructions for generating different requests. The memory can include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an example, the memory may include the file broker storage 214 and the file broker database 216.

Further, the file broker 306 may include one or more engines 306-1-306-5. The engines 306-1-306-5 may include routines, programs, objects, components, data structures, and the like, which perform particular tasks or implement particular abstract data types. Further, the engines 306-1-306-5 may be implemented in hardware, instructions executed by a processing unit, or by a combination thereof.

In an implementation, the engines 306-1-306-5 may be machine-readable instructions which, when executed by the processing unit, perform any of the described functionalities. The machine-readable instructions may be stored on an electronic memory device, hard disk, optical disk or other machine-readable storage medium or non-transitory medium. In one implementation, the machine-readable instructions can also be downloaded to the storage medium via a network connection.

The engines 306-1-306-5 may perform different functionalities. The engines 306-1-306-5 may include a tenant authentication engine 306-1, a URL generation engine 306-2, a malware scanning engine 306-3, an access key fetching engine 306-4, and a message transmission engine 306-5.

The tenant authentication engine 306-1 may authenticate a request from the tenant of the TMP. The request may be, for example, a request for uploading of the training content to the training content platform. For the authentication, the tenant authentication engine 306-1 may determine whether the tenant that has raised the request is an authorized tenant of the TMP based on an identity information stored in the keycloak unit 308 corresponding to each of the plurality of tenants of the TMP. In addition, for the authentication, the tenant authentication engine 306-1 may obtain an authentication token for authenticating the request from the tenant of the TMP. The authentication token may be obtained from the connections management unit 312. In an example, the tenant authentication engine 306-1 may also authenticate a message enquiring status of upload of the training content to the training content platform. For authenticate the message enquiring status of upload of the training content, the tenant authentication engine 306-1 determine whether the tenant that has sent the message enquiring the status of the upload of the training content is an authorized tenant of the TMP based on the identity information stored in the keycloak unit 308 corresponding to each of the plurality of tenants of the TMP. Further, the tenant authentication engine 306-1 may obtain an authentication token for authenticating the message enquiring status of the upload of the training content from the tenant of the TMP. The authentication token may be obtained from the connections management unit 312.

The URL generation engine 306-2 may generate a pre-signed URL for uploading of the training content by the TMP. The pre-signed URL may grant time-limited permission to upload or download the training content. The URL generation engine 306-2 may generate the pre-signed URL in response to a request from the tenant of the TMP to generate the pre-signed URL.

The malware scanning engine 306-3 may scan the training content for malware upon the uploading of the training content to the pre-signed URL by the training content platform. In response to presence of the malware in the training content, the malware scanning engine 306-3 may prevent fetching of the access key for the training content platform corresponding to the tenant.

The access key fetching engine 306-4 may fetch the access key for the training content platform corresponding to the tenant of the TMP that is to upload the training content to the training content platform. The access key may be fetched from the secret managing unit 310. The access key is to be used for sending the training content to the training content platform.

The message transmission engine 306-5 may facilitate transmission of messages, status updates, and the like to other components of the system 300, the training content platform, or the TMP. In response to the failure of the authentication of the request to upload the training content, the message transmission engine 306-5 may transmit a message to the tenant of the TMP indicative of failure of the authentication of the request. Further, in response to the presence of the malware in the training content, the message transmission engine 306-5 may update the file broker database 216 (not shown in FIG. 3) with a status message indicative of the presence of the malware in the training content. In a scenario, where the training content has been uploaded to the training content platform and an acknowledgement from the training content platform has been received, the message transmission engine 306-5 may update the file broker database 216 with a status message indicative of successful uploading of the training content to the training content platform.

In an example, the message transmission engine 306-5 may obtain, from the file broker database 216, a status of the upload of the training content. The obtaining of the status of the upload may be done upon successful authentication of the receipt of a message from a tenant of the TMP enquiring a status of upload of the training content to the training content platform. The message transmission engine 306-5 may transmit a status message indicative of the status of the uploading of the training content to the tenant of the TMP upon obtaining from the training content platform. In an example, if authentication of the receipt of a message from a tenant of the TMP enquiring a status of upload of the training content to the training content platform has failed, the message transmission engine 306-5 may transmit a status message to the tenant of the TMP indicative of failure of the authentication of the request.

The keycloak unit 308 may be part of a computing device that has processing capabilities, such as a server, a desktop, a laptop, a tablet, a mobile phone, or the like. For instance, the keycloak unit 308 may be part of, for example, a microprocessor, a microcomputer, a microcontroller, a digital signal processor, a central processing unit, a state machine, a logic circuitry, or a device that manipulates signals based on operational instructions. Among other capabilities, the processing unit (not shown in FIG. 3) may fetch and execute computer-readable instructions stored in a memory (not shown in FIG. 3), such as a volatile memory or a non-volatile memory, of the computing device.

The processing unit (not shown in FIG. 3) may run at least one operating system and other applications and services. The computing device can also include an interface (not shown in FIG. 3) and a memory (not shown in FIG. 3).

The processing unit, amongst other capabilities, may be configured to fetch and execute computer-readable instructions stored in the memory. The processing unit may be implemented as one or more microprocessors, microcomputers, microcontrollers, digital signal processors, central processing units, state machines, logic circuitries, and/or any devices that manipulate signals based on operational instructions. The functions of the various elements shown in the figure, including any functional blocks labelled as "processing unit", may be provided through the use of dedicated hardware as well as hardware capable of executing machine readable instructions.

When provided by the processing unit, the functions may be provided by a single dedicated processor, by a single shared processor, or by a plurality of individual processors, some of which may be shared. Moreover, explicit use of the term "processing unit" should not be construed to refer exclusively to hardware capable of executing machine readable instructions, and may implicitly include, without limitation, digital signal processor (DSP) hardware, network processor, application specific integrated circuit (ASIC), field programmable gate array (FPGA), read only memory (ROM) for storing machine readable instructions, random access memory (RAM), non-volatile storage. Other hardware, conventional and/or custom, may also be included.

The interface may include a variety of machine-readable instructions-based interfaces and hardware interfaces that allow the cloud communication device to interact with different entities, such as the processing unit, and the data (not shown in FIG. 3). Further, the interface may enable the components of the file broker 306 to communicate with other cloud servers, web servers, and external repositories. The interface may facilitate multiple communications within a wide variety of networks and protocol types, including wireless networks, wireless Local Area Network (WLAN), RAN, satellite-based network, and the like.

The memory may be coupled to the processing unit and may, among other capabilities, provide data and instructions for generating different requests. The memory can include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

Further, the keycloak unit 308 may include an engine 308-1. The engine 308-1 may include routines, programs, objects, components, data structures, and the like, which perform particular tasks or implement particular abstract data types. Further, the engine 308-1 may be implemented in hardware, instructions executed by a processing unit, or by a combination thereof.

In an implementation, the engine 308-1 may be machine-readable instructions which, when executed by the processing unit, perform any of the described functionalities. The machine-readable instructions may be stored on an electronic memory device, hard disk, optical disk or other machine-readable storage medium or non-transitory medium. In one implementation, the machine-readable instructions can also be downloaded to the storage medium via a network connection.

The engine 308-1 may be an identity information storage engine 308-1. The identity information storage engine 308-1 may facilitate storage of identity information corresponding to each of the plurality of tenants of the TMP. The identity information may include Identity and Access Management (IAM) Credentials, such as password, unique Identification number corresponding to each of the tenants of the TMP, roles corresponding to each tenant, such as an administrator role, and the like, along with access allowed for the tenant, and the like. When the tenant of the TMP is on-boarded onto the TMP, the identity information may be created by the TMP, which may be transmitted to the identity information storage engine 308-1 for storing the identity information.

The secret managing unit 310 may be part of a computing device that has processing capabilities, such as a server, a desktop, a laptop, a tablet, a mobile phone, or the like. For instance, the secret managing unit 310 may be part of, for example, a microprocessor, a microcomputer, a microcontroller, a digital signal processor, a central processing unit, a state machine, a logic circuitry, or a device that manipulates signals based on operational instructions. Among other capabilities, the processing unit (not shown in FIG. 3) may fetch and execute computer-readable instructions stored in a memory (not shown in FIG. 3), such as a volatile memory or a non-volatile memory, of the computing device.

The processing unit (not shown in FIG. 3) may run at least one operating system and other applications and services. The computing device can also include an interface (not shown in FIG. 3) and a memory (not shown in FIG. 3).

The processing unit, amongst other capabilities, may be configured to fetch and execute computer-readable instructions stored in the memory. The processing unit may be implemented as one or more microprocessors, microcomputers, microcontrollers, digital signal processors, central processing units, state machines, logic circuitries, and/or any devices that manipulate signals based on operational instructions. The functions of the various elements shown in the figure, including any functional blocks labelled as "processing unit", may be provided through the use of dedicated hardware as well as hardware capable of executing machine readable instructions.

When provided by the processing unit, the functions may be provided by a single dedicated processor, by a single shared processor, or by a plurality of individual processors, some of which may be shared. Moreover, explicit use of the term "processing unit" should not be construed to refer exclusively to hardware capable of executing machine readable instructions, and may implicitly include, without limitation, digital signal processor (DSP) hardware, network processor, application specific integrated circuit (ASIC), field programmable gate array (FPGA), read only memory (ROM) for storing machine readable instructions, random access memory (RAM), non-volatile storage. Other hardware, conventional and/or custom, may also be included.

The interface may include a variety of machine-readable instructions-based interfaces and hardware interfaces that allow the cloud communication device to interact with different entities, such as the processing unit, and the data (not shown in FIG. 3). Further, the interface may enable the components of the file broker 306 to communicate with other cloud servers, web servers, and external repositories. The interface may facilitate multiple communications within a wide variety of networks and protocol types, including wireless networks, wireless Local Area Network (WLAN), RAN, satellite-based network, and the like.

The memory may be coupled to the processing unit and may, among other capabilities, provide data and instructions for generating different requests. The memory can include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

Further, the secret managing unit 310 may include an engine 310-1. The engine 310-1 may include routines, programs, objects, components, data structures, and the like, which perform particular tasks or implement particular abstract data types. Further, the engine 310-1 may be implemented in hardware, instructions executed by a processing unit, or by a combination thereof.

In an implementation, the engine 310-1 may be machine-readable instructions which, when executed by the processing unit, perform any of the described functionalities. The machine-readable instructions may be stored on an electronic memory device, hard disk, optical disk or other machine-readable storage medium or non-transitory medium. In one implementation, the machine-readable instructions can also be downloaded to the storage medium via a network connection.

The engine 310-1 may be an access keys storage engine 310-1 that may facilitate storage of access keys for the training content platform corresponding to each of the plurality of tenants of the TMP. The use of access keys may enable secured access of the training content platform. In an example, the training content platform may generate an access key corresponding to each of the plurality of tenants of the TMP upon the on-boarding of each of the plurality of tenants. The training content platform may transmit the access keys corresponding to each of the plurality of tenants of the TMP to the access keys storage engine 310-1.

The connections management unit 312 may be part of a computing device that has processing capabilities, such as a server, a desktop, a laptop, a tablet, a mobile phone, or the like. For instance, the connections management unit 312 may be part of, for example, a microprocessor, a microcomputer, a microcontroller, a digital signal processor, a central processing unit, a state machine, a logic circuitry, or a device that manipulates signals based on operational instructions. Among other capabilities, the processing unit (not shown in FIG. 3) may fetch and execute computer-readable instructions stored in a memory (not shown in FIG. 3), such as a volatile memory or a non-volatile memory, of the computing device.

The processing unit (not shown in FIG. 3) may run at least one operating system and other applications and services.

The computing device can also include an interface (not shown in FIG. 3) and a memory (not shown in FIG. 3).

The processing unit, amongst other capabilities, may be configured to fetch and execute computer-readable instructions stored in the memory. The processing unit may be implemented as one or more microprocessors, microcomputers, microcontrollers, digital signal processors, central processing units, state machines, logic circuitries, and/or any devices that manipulate signals based on operational instructions. The functions of the various elements shown in the figure, including any functional blocks labelled as "processing unit", may be provided through the use of dedicated hardware as well as hardware capable of executing machine readable instructions.

When provided by the processing unit, the functions may be provided by a single dedicated processor, by a single shared processor, or by a plurality of individual processors, some of which may be shared. Moreover, explicit use of the term "processing unit" should not be construed to refer exclusively to hardware capable of executing machine readable instructions, and may implicitly include, without limitation, digital signal processor (DSP) hardware, network processor, application specific integrated circuit (ASIC), field programmable gate array (FPGA), read only memory (ROM) for storing machine readable instructions, random access memory (RAM), non-volatile storage. Other hardware, conventional and/or custom, may also be included.

The interface may include a variety of machine-readable instructions-based interfaces and hardware interfaces that allow the cloud communication device to interact with different entities, such as the processing unit, and the data (not shown in FIG. 3). Further, the interface may enable the components to communicate with other cloud servers, web servers, and external repositories. The interface may facilitate multiple communications within a wide variety of networks and protocol types, including wireless networks, wireless Local Area Network (WLAN), RAN, satellite-based network, and the like.

The memory may be coupled to the processing unit and may, among other capabilities, provide data and instructions for generating different requests. The memory can include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

Further, the connections management unit 312 may include an engine 312-1. The engine 312-1 may include routines, programs, objects, components, data structures, and the like, which perform particular tasks or implement particular abstract data types. Further, the engine 312-1 may be implemented in hardware, instructions executed by a processing unit, or by a combination thereof.

In an implementation, the engine 312-1 may be machine-readable instructions which, when executed by the processing unit, perform any of the described functionalities. The machine-readable instructions may be stored on an electronic memory device, hard disk, optical disk or other machine-readable storage medium or non-transitory medium. In one implementation, the machine-readable instructions can also be downloaded to the storage medium via a network connection.

The engine 312-1 may be a multi-tenant configuration management engine 312-1 that facilitates maintenance of a multi-tenant configuration for managing connection for each of the plurality of tenants of the TMP with the training content platform. In other words, the multi-tenant configuration management engine 312-1 may provide an authentication token for connection of each of the tenants of the TMP with the training content platform that may be used by the tenant authentication engine 306-1 of the file broker 306.

Figure 4A:
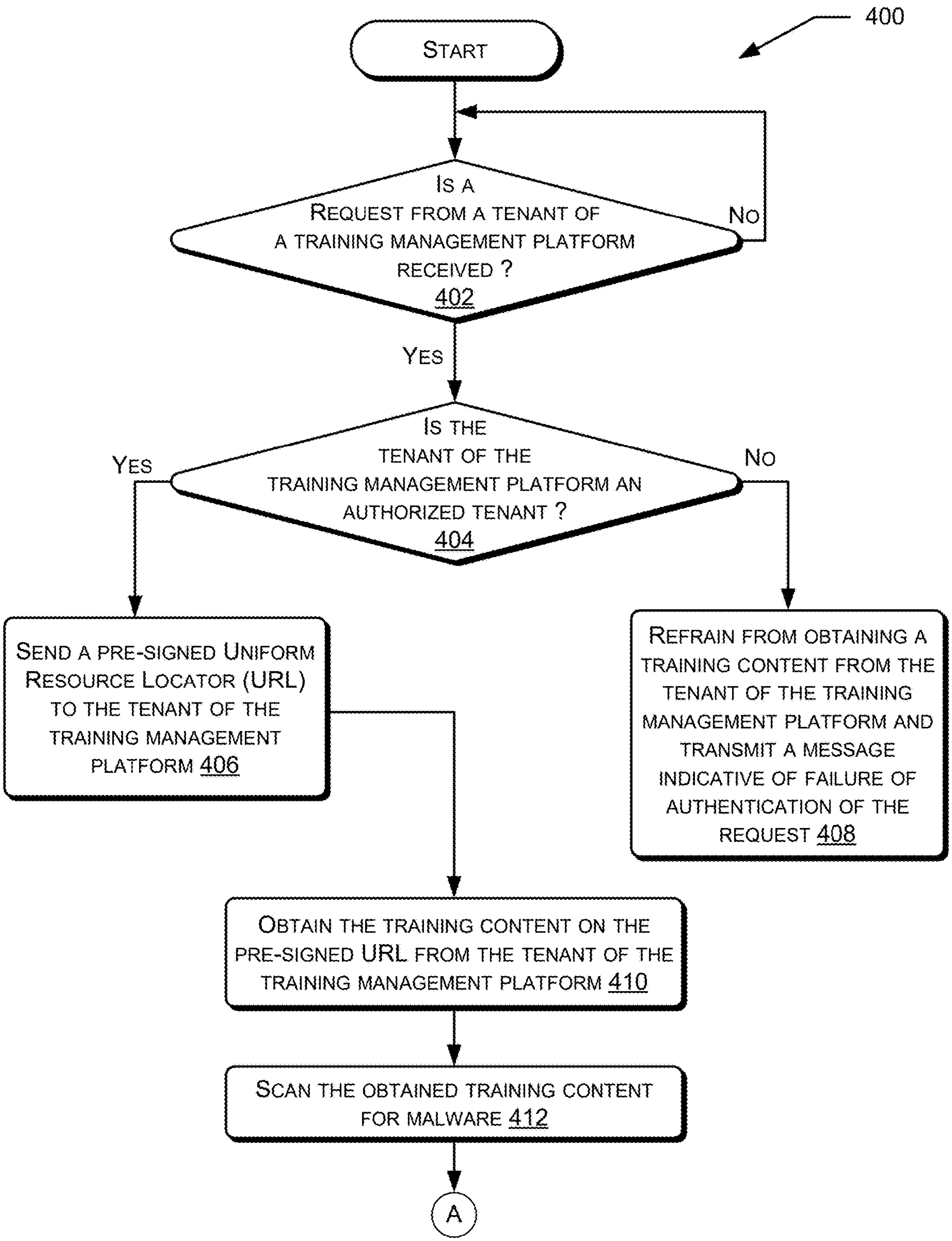
FIGS. 4*a* and 4*b* illustrate a method for integration of a training content platform with a training management platform, according to an example implementation of the present subject matter.
Figure 4B:
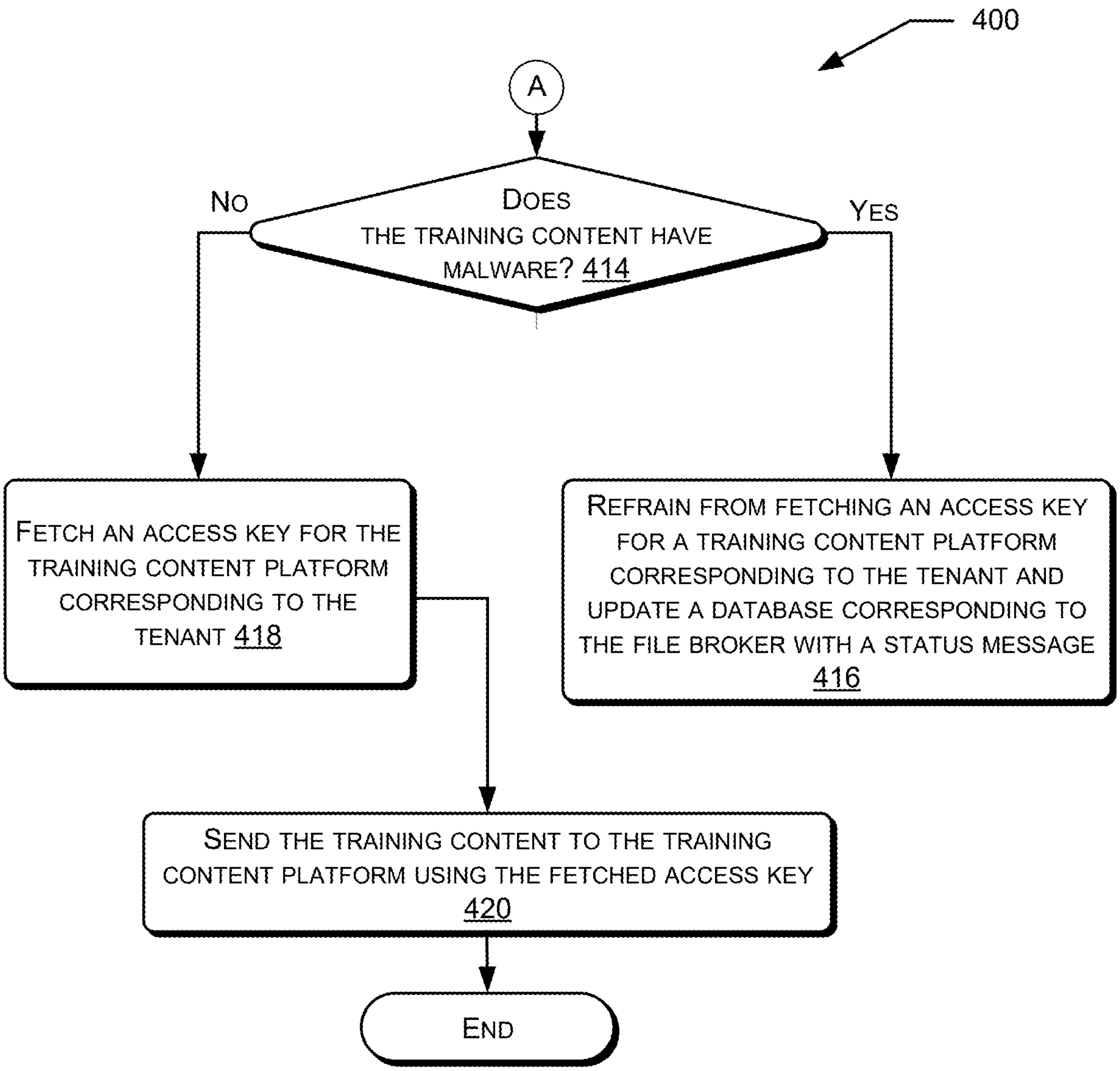

FIGS. 4*a* and 4*b* illustrate a method 400 for integration of a training content platform with a TMP, according to an example implementation of the present subject matter. The order in which the method 400 is described is not intended to be construed as a limitation, and any number of the described method blocks may be combined in any order to implement the method 400, or an alternative method. Furthermore, the method 400 may be implemented by processor(s) or computing device(s) through any suitable hardware, non-transitory machine-readable instructions, or a combination thereof.

It may be understood that steps of the method 400 may be performed by programmed computing devices and may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. In an example, the method 400 may be performed by the system 100, the system 200, or the system 300.

At step 402, it may be determined if a request from a tenant of a TMP is received. In particular, a file broker of the system may receive a request from the tenant of the TMP. The request may be indicative of a request to upload a training content to a training content platform. The training content may be, for example, video files, image files, audio files, graphic files, text files, and the like. The training content platform may be, for example, Rustici engine that is to support Sharable Content Object Reference Model (SCORM)-compliant training content and to manage the training content. The training content platform may be, for example, Rustici-engine. The TMP may be, for example, Salesforce TMP. The TMP may be, for example, the TMP 104 or the TMP 204. The training content platform may correspond to the training content platform 102 or the training content platform 202. The file broker may correspond to the file broker 106, the file broker 206, or the file broker 306. For instance, assume that a video file is to be uploaded by a tenant of the TMP onto the training content platform. In this regard, it may be determined if the file broker of the system received a request from the tenant that is to upload the video file.

If, at step 402, it is determined that the file broker has received the request, the method 400 may proceed to step 404. On the other hand, if, at step 402, it is determined that the file broker has not received the request, the method 400 may repeat the step 402.

In response to receiving the request from the tenant, the request may have to be authenticated. Accordingly, at step 404, it may be determined if the tenant that has raised the request is an authorized tenant. In this regard, the file broker may use an identity information corresponding to each of the plurality of tenant of the TMP stored in a keycloak unit. The keycloak unit may correspond to the keycloak unit 108, the keycloak unit 208, or the keycloak unit 308. Assume that a first tenant of the TMP has an administrator role and has an authorization to upload the training content to the training content platform. Further, assume that a second tenant of the TMP has a user role and has an authorization to only view the training content through the TMP and does not have an authorization to upload the training content. In this regard, assume that the first tenant of the TMP has raised the request to upload the training content, the file broker may determine if the first tenant is an authorized tenant. The file broker may use the identity information, such as a unique identifier of the first tenant and the role corresponding to the first tenant, stored in the keycloak unit. In other words, upon receiving the request from the first tenant, the file broker may obtain identity information of the first tenant from the keycloak unit and may determine that the first tenant has an authorization to upload the training content. Based on the determination, the file broker may authenticate the request. In an example, the step 404 may be performed by tenant authentication engine 306-1. If, at step 404, it is determined that the tenant is an authorized tenant, the method 400 may proceed to step 406.

At step 406, in response to successful authentication of the request, the file broker may obtain the training content from the tenant. In this regard, the file broker may send a pre-signed URL to the tenant of the TMP. The file broker may send the pre-signed URL upon receiving a request from the tenant of the TMP to send the pre-signed URL. For instance, in response to the successful authentication of the request, the file broker may send a message indicating the successful authentication of the request to the first tenant. The first tenant may request the file broker to send the pre-signed URL to the first tenant through an API gateway. In response, the file broker may send the pre-signed URL to the first tenant. Subsequent to step 406, the step 410 may be performed, as will be explained later.

If, at step 404, it is determined that the tenant is an unauthorized tenant, the method 400 may proceed to step 408. For instance, assume that the second tenant has raised a request to upload the training content. The file broker may use the identity information, such as a unique identifier of the second tenant and the role corresponding to the second tenant, stored in the keycloak unit. In other words, upon receiving the request from the second tenant, the file broker may obtain identity information of the second tenant from the keycloak unit. Further, the file broker may determine that the second tenant has a user role and does not have an authorization to upload the training content. Based on the determination, the file broker may not authenticate the request of the second tenant. At step 408, in response to failure of the authentication, the file broker may refrain from obtaining the training content from the tenant of the TMP. The file broker may transmit a status message indicative of the failure of the authentication of the request to the tenant of the TMP. For instance, in response to the failure of the authentication of the request of the second tenant, the file broker may refrain from obtaining the training content from the second tenant and may transmit a status message to the second tenant indicating the failure of the authentication.

At step 410, the file broker may obtain the training content on the pre-signed URL from the tenant of the TMP. For instance, the file broker may obtain the video file on the pre-signed URL from the first tenant.

In an example, the training content that is to be uploaded by the tenant may include malware. Accordingly, the uploading of the training content with malware may comprise data security of the training content platform and the TMP. For instance, assume that the video file uploaded by the first tenant on the pre-signed URL includes a malware. If the video file with the malware is uploaded to the training content platform, serious breach may be caused to the identity information corresponding to the tenants of the TMP, the data in the training content platform, the data corresponding to the TMP, and the like. Therefore, to prevent the training content being uploaded with the malware, the method may perform the step 412. At step 412, upon receiving the training content on the pre-signed URL, the file broker may scan the training content for malware. For instance, the file broker may scan the video file uploaded by the first tenant on the pre-signed URL for malware.

At step 414, based on the scanning, the file broker may determine if the training content has malware. For instance, assume that the video file has malware. Accordingly, upon the scanning of the video file, the file broker may determine that the video file has malware. Upon the determination that the file broker has malware, the method 400 may proceed to step 416. In another scenario, assume that the video file does not have any malware. Accordingly, upon the scanning of the video file, the file broker may determine that the video file does not have any malware. Upon determining that the video file does not have any malware, the method 400 may proceed to step 418.

At step 416, the file broker may refrain from fetching an access key for the training content platform corresponding to tenant. For instance, during or upon the on-boarding of each of the plurality of tenants, the training content platform may generate an access key corresponding to each of the plurality of tenants of the TMP. The training content may transmit the access keys corresponding to each of the plurality of tenants of the TMP to a secret managing unit. The secret managing unit may store access keys for the training content platform corresponding to each of the plurality of tenants of the TMP. The secret managing unit may correspond to the secret managing unit 110, the secret managing unit 210, or the secret managing unit 310. Further, the file broker may also update a database corresponding to the file broker with a status message. The status message may be indicative of the presence of the malware in the training content. The database may correspond to the file broker database 216. For instance, upon the determination that the video file has a malware, the file broker may refrain from fetching an access key for the training content platform corresponding to the first tenant that uploaded the video file. Further, the file broker may update the file broker database with a status message indicating that the video file has malware.

At step 418, in response to absence of malware in the training content, the file broker may fetch an access key for the training content platform corresponding to the tenant of the TMP. For instance, in response to the determination by the file broker that the video file does not have any malware, the file broker may fetch the access key from the secret managing unit. The access key may be for accessing of the training content platform by the first tenant that uploaded the video file on the pre-signed URL.

Subsequently, at step 420, the file broker may send the training content to the training content platform using the fetched access key. For instance, the file broker may send the video file to the training content platform for uploading thereof using the access key to the training content platform corresponding to the first tenant. In an example, upon the sending of the training content to the training content platform, the method 400 may include transmission of an acknowledgement message by the training content platform to the file broker. The acknowledgement message may indicate successful uploading of the training content to the training content platform. Upon receiving the acknowledgement message, the file broker may update the file broker database with a status message indicating successful uploading of the training content to the training content platform. For instance, upon the successful uploading of the video file to the training content platform, the training content platform may transmit an acknowledgement message to indicate that the video file has been successfully uploaded to the training content platform. Upon receiving the acknowledgement message, the file broker may update the file broker database with a status message indicating successful uploading of the video file to the training content platform. The status message may be updated to an entry in the file broker database corresponding to the first tenant.

In some scenarios, the tenant that has raised the request for uploading of the training content onto the training content platform may want to know the status of the uploading of the training content. Accordingly, the tenant may request the file broker regarding the status of the uploading of the training content, as will be explained below.

Figure 5:
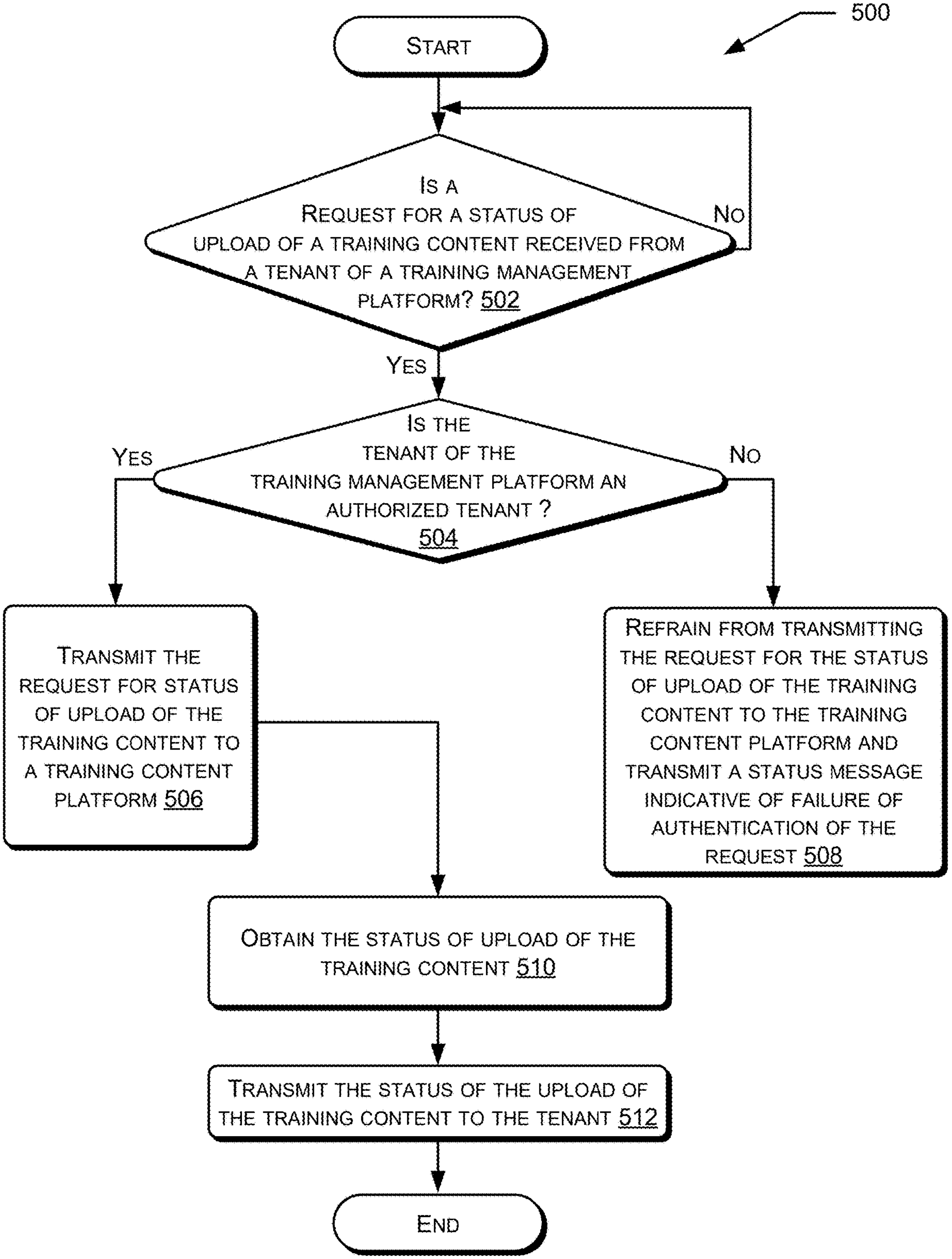
FIG. 5 illustrates a method for request of status of upload of a training content, according to an example implementation of the present subject matter.

FIG. 5 illustrates a method 500 for request of status of upload of the training content, according to an example implementation of the present subject matter. The order in which the method 500 is described is not intended to be construed as a limitation, and any number of the described method blocks may be combined in any order to implement the method 500, or an alternative method. Furthermore, the method 500 may be implemented by processor(s) or computing device(s) through any suitable hardware, non-transitory machine-readable instructions, or a combination thereof.

It may be understood that steps of the method 500 may be performed by programmed computing devices and may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. In an example, the method 500 may be performed by the system 100, the system 200, or the system 300.

At step 502, it may be determined if a request for a status of upload of a training content received from a tenant of a TMP. The request may be a message enquiring status of the upload of the training content to the training content platform and may be received by a file broker of the system. The training content may be, for example, video files, image files, audio files, graphic files, text files, and the like. The training content platform may be, for example, Rustici engine that is to support Sharable Content Object Reference Model (SCORM)-compliant training content and to manage the training content. Hereinafter, the training content platform will be explained with reference to Rustici-engine. The TMP may be, for example, Salesforce TMP. Hereinafter, the TMP will be explained with reference to Salesforce TMP. The TMP may be, for example, the TMP 104 or the TMP 204. The training content platform may correspond to the training content platform 102 or the training content platform 202. The file broker may correspond to the file broker 106, the file broker 206, or the file broker 306.

For instance, assume that a video file is uploaded based on a request from a first tenant of the TMP onto the training content platform. Further, assume that a graphics file that is to be uploaded by a second tenant of the TMP was not uploaded onto the training platform because of a presence of malware. Yet further, assume that an image file that is to be uploaded by a third tenant of the TMP is being uploaded on the training content platform and the upload is not fully complete yet. Further, assume that a fourth tenant that has not uploaded any file. In this regard, assume that the first tenant has raised a request to the file broker for the status of the upload of the video file, the second tenant has raised a request to the file broker for the status of the upload of the graphics file, the third tenant has raised a request to the file broker for the status of upload of the image file, and the fourth tenant has raised a request to the file broker for the status of upload of the video file. In this regard, the file broker may determine if a request from the tenant is received. If it is determined that the request is received, the method 500 may proceed to step 504. On the other hand, if it is determined that the request has not been received, the method 500 may repeat the step 502.

In response to receiving the request from the tenant, the request may have to be authenticated. For instance, it may have to be determined if the tenant that has raised the request is an authorized tenant for raising the request. Accordingly, at step 504, it may be determined if the tenant that has raised the request is an authorized tenant. In this regard, the file broker may use an identity information corresponding to each of the plurality of tenant of the TMP stored in a keycloak unit. The keycloak unit may correspond to the keycloak unit 108, the keycloak unit 208, or the keycloak unit 308.

For instance, assume that the first tenant, the second tenant, and the third tenant may have an administrator role and may have an authorization to enquire about status of upload of the training content uploaded by any of the tenants of the TMP. Further, assume that the fourth tenant of the TMP has a user role and has an authorization to only view the training content through the TMP and does not have an authorization to request for status of upload of the training content. In this regard, the file broker may determine that the first tenant, the second tenant, and the third tenant are authorized tenants for raising the request for status of the upload. Further, the file broker may determine that the fourth tenant is an unauthorized tenant to raise the request for the status of the upload. The file broker may use the identity information, such as a unique identifier of the first tenant, the second tenant, the third tenant, and the fourth tenant, and the role corresponding to the first tenant, the second tenant, the third tenant, and the fourth tenant, stored in the keycloak unit. In other words, upon receiving the request from the first tenant, the second tenant, and the third tenant, the file broker may obtain identity information of the first tenant, the second tenant, and the third tenant from the keycloak unit. Further, the file broker may determine that the first tenant, the second tenant, and the third tenant have an authorization to request for the status of upload of the training content. Similarly, upon receiving the request from the fourth tenant, the file broker may obtain identity information of the fourth tenant and may determine that the fourth tenant does not have an authorization to request for the status of upload of the training content. Based on the determination, the file broker may authenticate the request. In an example, the step 504 may be performed by tenant authentication engine 306-1.

If, at step 504, it is determined that the tenant is an authorized tenant, the method 500 may proceed to step 506. For instance, the file broker may determine that the first tenant, the second tenant, and the third tenant may have an authorization to request for the status of the upload of the training content. Accordingly, the file broker may authenticate the request from the first tenant, the second tenant, and the third tenant and the method 500 may proceed to step 506. If, at step 504, it is determined that the tenant if not an authorized tenant, the method 500 may proceed to step 508. For instance, the file broker may determine that the fourth tenant does not have an authorization to request for the status of the upload of the training content. Accordingly, the file broker may not authenticate the request from the fourth tenant and the method 500 may proceed to step 508.

At step 506, in response to successful authentication of the request, the file broker may transmit the request for status of the upload of the training content to the training content platform. The file broker may transmit the request to a file broker database, such as the file broker database 216. For instance, the file broker may transmit the request of the first tenant, the second tenant, and the third tenant to the file broker database. Subsequently, the method 500 may perform the step 510, as will be explained later.

At step 508, in response to failure of the authentication of the request, the file broker may refrain from transmitting the request for status of the upload of the training content to the training content platform. The file broker may refrain from transmitting the request to the file broker database. Further, the file broker may transmit a status message to the tenant of the TMP. The status message may be indicative of the failure of the authentication of the request. The status message may be transmitted through the API gateway. For instance, in response to the failure of the authentication of the request from the fourth tenant, the file broker may refrain from transmitting the request from the fourth tenant to the file broker database. Further, the file broker may transmit the status message to the fourth tenant indicating the failure of the authentication of the request.

As mentioned earlier, subsequent to the step 506, the step 510 may be performed. At step 510, the file broker may obtain the status of the upload of the training content. The status may be obtained from the file broker database. For instance, in response to the request from the first tenant, the file broker may obtain a status that indicates that the video file has been uploaded to the training content platform. In response to the request from the second tenant, the file broker may obtain a status that indicates that the graphics file is not uploaded onto the training platform. In an example, the file broker may also indicate that the graphics file has not been uploaded due to presence of the malware. In response to the request from the third tenant, the file broker may obtain a status that indicates that the uploading of the image file to the training content platform is under progress.

Further, at step 512, the file broker may transmit the status of the upload of the training content to the tenant that raised the request. For instance, the file broker may transmit a status, to the first tenant, indicating that the video file has been uploaded to the training content platform. The file broker may transmit a status, to the second tenant, indicating that the graphics file is not uploaded onto the training platform due to presence of the malware. The file broker may transmit a status, to the third tenant, indicating that the uploading of the image file to the training content platform is under progress.

Figure 6A:
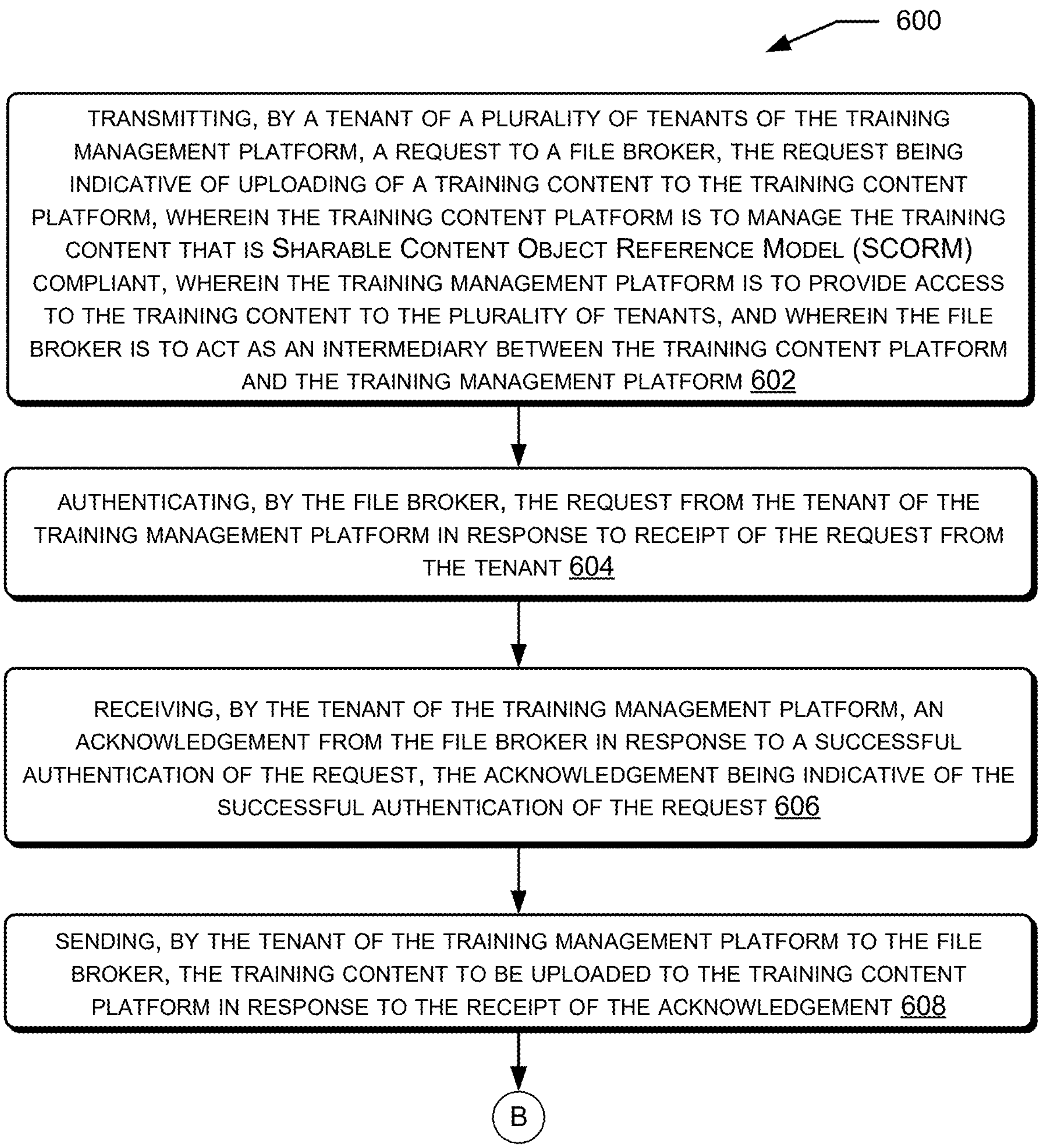
FIGS. 6*a* and 6*b* illustrate a method for integration of a training content platform with a training management platform, according to an example implementation of the present subject matter.
Figure 6B:
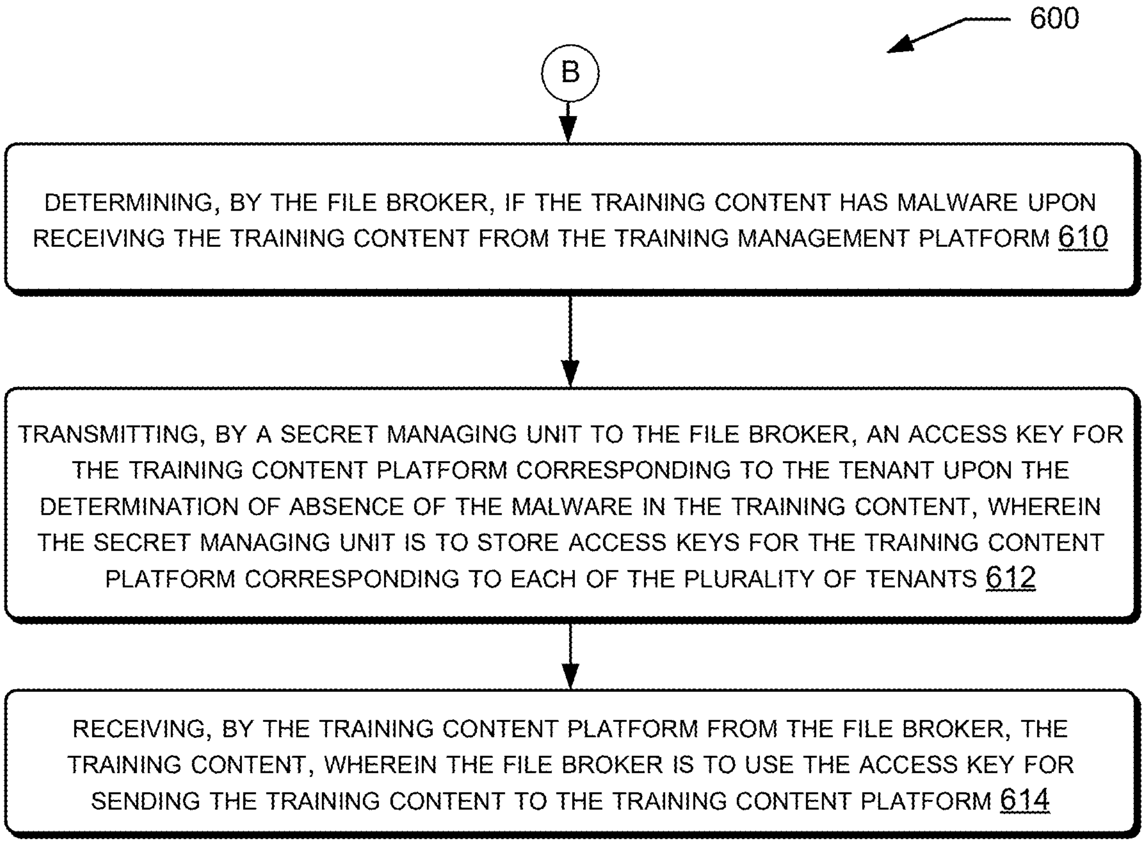

FIGS. 6*a* and 6*b* illustrate a method 600 for integration of a training content platform with a TMP, according to an example implementation of the present subject matter. The order in which the method 600 is described is not intended to be construed as a limitation, and any number of the described method blocks may be combined in any order to implement the method 600, or an alternative method. Furthermore, the method 600 may be implemented by processor(s) or computing device(s) through any suitable hardware, non-transitory machine-readable instructions, or a combination thereof.

It may be understood that steps of the method 600 may be performed by programmed computing devices and may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. In an example, the method 600 may be performed by the system 100, the system 200, or the system 300.

Referring to FIG. 6*a*, at step 602, a request to a file broker may be transmitted by a tenant of a plurality of tenants of the TMP. The request may be indicative of uploading of the training content to the training content platform. The training content may be, for example, video files, image files, audio files, graphic files, text files, and the like. The training content platform may manage the training content that is Sharable Content Object Reference Model (SCORM) compliant. The TMP may provide access to the training content to the plurality of tenants. The file broker may act as an intermediary between the training content platform and the TMP. The training content platform may correspond to the training content platform 102 or the training content platform 202. The TMP may correspond to the TMP 104 or the TMP 204. In an example, the training content platform may be a Rustici engine and the TMP may be a Salesforce TMP. The file broker may correspond to the file broker 106, the file broker 206, or the file broker 306.

At step 604, the request from the tenant of the TMP may be authenticated by the file broker, in response to receipt of the request from the tenant. At step 606, in response to a successful authentication of the request, an acknowledgement may be received from the file broker. The acknowledgement may be received by the tenant of the TMP and may be indicative of the successful authentication of the request.

At step 608, the training content to be uploaded to the training content platform may be sent by the tenant of the TMP to the file broker. The training content may be sent in response to the receipt of the acknowledgement. Referring to FIG. 6*b*, at step 610, the method 600 may include determining, by the file broker, if the training content has malware upon receiving the training content from the TMP.

At step 612, upon the determination of absence of the malware in the training content, an access key for the training content platform corresponding to the tenant may be transmitted by a secret managing unit to the file broker. The secret managing unit may store access keys for the training content platform corresponding to each of the plurality of tenants. The secret managing unit may correspond to the secret managing unit 110, the secret managing unit 210, or the secret managing unit 310.

At step 614, the method 600 may include receiving, by the training content platform from the file broker, the training content. The file broker may use the access key for sending the training content to the training content platform.

In an example, the method 600 may include maintaining, by a keycloak unit, identity information corresponding to each of the plurality of tenants of the TMP. The keycloak unit may correspond to the keycloak unit 108, the keycloak unit 208, or the keycloak unit 308. It may be determined, by the file broker, whether the tenant that has raised the request is an authorized tenant of the TMP based on the identity information corresponding to each of the plurality of tenants of the TMP maintained in the keycloak unit. The method 600 may include receiving, by the tenant of the TMP, the acknowledgement from the file broker in response to the determination that the tenant that has raised the request is an authorized tenant of the TMP. The acknowledgement may be indicative of successful authentication of the request.

In an example, upon receiving the acknowledgement from the file broker in response to the successful authentication of the request, the method 600 may include receiving, by the tenant of the TMP, a pre-signed URL from the file broker for secure uploading of the training content. The tenant of the TMP may send the training content on the pre-signed URL to the file broker.

The method 600 may include maintaining, by a connections management unit, multi-tenant configuration for managing connection of each of the plurality of tenants of the TMP with the training content platform. The connections management unit may correspond to the connections management unit 112, the connections management unit 212, or the connections management unit 312. An authentication token may be sent, to the file broker, by the connections management unit for authenticating the request from the tenant of the TMP.

In an example, the method 600 may include sending, by the tenant of the TMP, a message enquiring status of upload of the training content to the training content platform. The message from the tenant of the TMP may be authenticated by the file broker. The method 600 may include obtaining, by the file broker from a database corresponding to the file broker, the status of upload of the training content to the training content platform in response to a successful authentication. Further, the status of upload of the training content to the training content platform from the file broker may be received, by the tenant of the TMP.

In an example, in response to a failure of the authentication of the message from the tenant of the TMP, the method 600 may include refraining, by the file broker, from obtaining the status of upload of the training content to the training content platform.

Figure 7A:
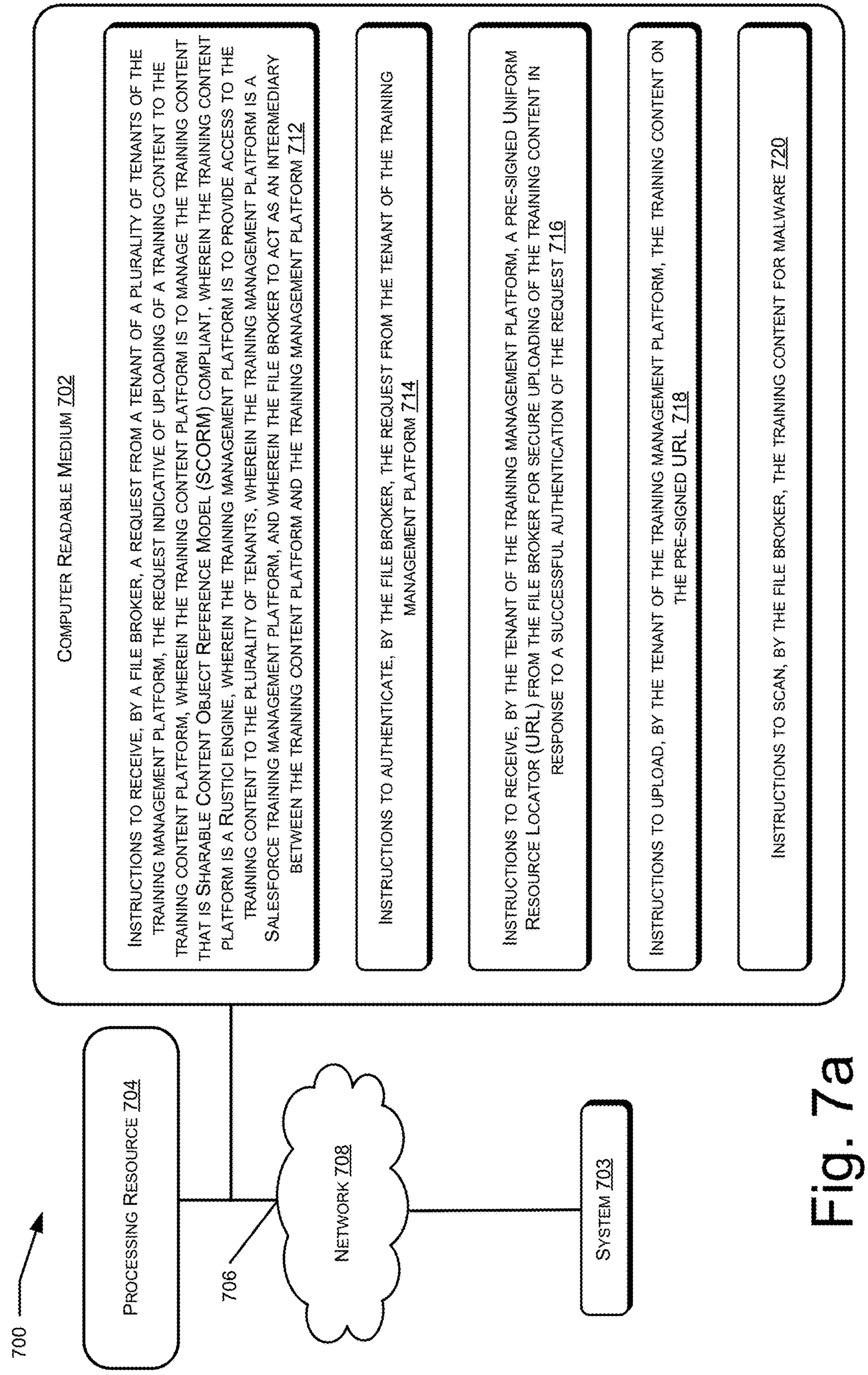
FIGS. 7*a*-7*b* illustrates a computing environment, implementing a non-transitory computer-readable medium for integration of a training content platform with a training management platform, according to an example implementation of the present subject matter.
Figure 7B:
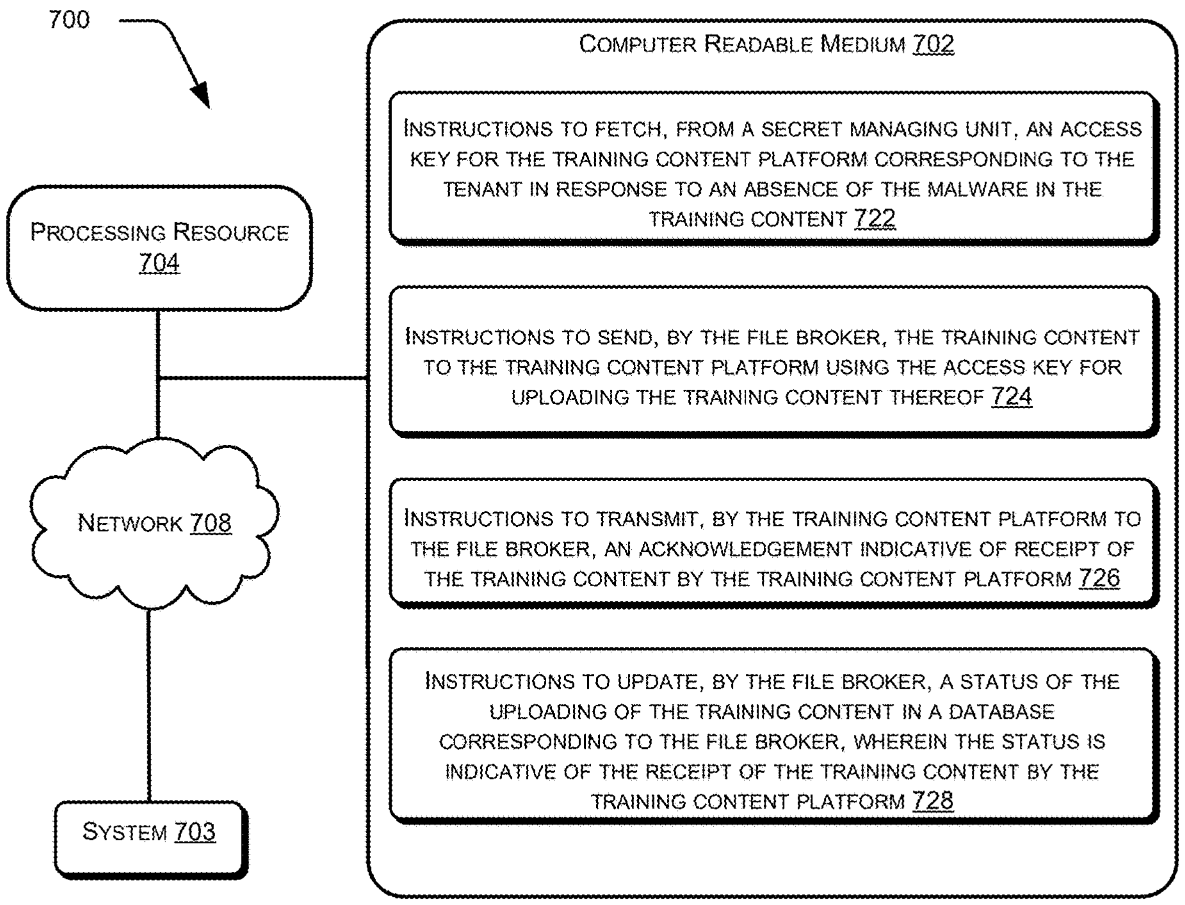

FIGS. 7*a*-7*b* illustrates a computing environment 700, implementing a non-transitory computer-readable medium for integration of a training content platform with a TMP, according to an example implementation of the present subject matter.

In an example, the non-transitory computer-readable medium 702 may be utilized by the system 703. The system 703 may correspond to the system 100, the system 200, or the system 300. The system 703 may be implemented in a public networking environment or a private networking environment. In an example, the computing environment 700 may include a processing resource 704 communicatively coupled to the non-transitory computer-readable medium 702 through a communication link 706.

In an example, the processing resource 704 may be implemented in a device, such as the system 703. The non-transitory computer-readable medium 702 may be, for example, an internal memory device of the system 703 or an external memory device. In an implementation, the communication link 706 may be a direct communication link, such as any memory read/write interface. In another implementation, the communication link 706 may be an indirect communication link, such as a network interface. In such a case, the processing resource 704 may access the non-transitory computer-readable medium 702 through a network 708. The network 708 may be a single network or a combination of multiple networks and may use a variety of different communication protocols. The processing resource 704 and the non-transitory computer-readable medium 702 may also be communicatively coupled to the system 703 over the network 708.

In an example implementation, the non-transitory computer-readable medium 702 includes a set of computer-readable instructions to obtain signed certificates for on-premise devices. The set of computer-readable instructions can be accessed by the processing resource 704 through the communication link 706 and subsequently executed to perform acts to provide feedback to the actuating object.

Referring to FIG. 7*a*, in an example, the non-transitory computer-readable medium 702 includes instructions 712 to receive, by a file broker, a request from a tenant of a plurality of tenants of the TMP. The request may be indicative of uploading training content to the training content platform. The training content platform may manage the training content that is Sharable Content Object Reference Model (SCORM) compliant. In an example, the training content platform may be a Rustici engine. The TMP may provide access to the training content to the plurality of tenants. The TMP may be a Salesforce TMP. The file broker may act as an intermediary between the training content platform and the TMP. The training content platform may correspond to the training content platform 102 or the training content platform 202. The TMP may correspond to the TMP 104 or the TMP 204. The file broker may correspond to the file broker 106, the file broker 206, or the file broker 306.

The non-transitory computer-readable medium 702 includes instructions 714 to authenticate, by the file broker, the request from the tenant of the TMP. The authentication may be performed as explained with reference to FIG. 4*a*.

The non-transitory computer-readable medium 702 includes instructions 716 to receive, by the tenant of the TMP, a pre-signed URL from the file broker for secure uploading of the training content in response to a successful authentication of the request.

The non-transitory computer-readable medium 702 includes instructions 718 to upload, by the tenant of the TMP, the training content on the pre-signed URL. The non-transitory computer-readable medium 702 includes instructions 720 to scan, by the file broker, the training content for malware. The scanning may be performed, as explained with reference to FIGS. 4*a* and 4*b*.

Referring to FIG. 7*b*, the non-transitory computer-readable medium 702 includes instructions 722 to fetch, from a secret managing unit, an access key for the training content platform corresponding to the tenant in response to an absence of the malware in the training content. The secret managing unit may correspond to the secret managing unit 110, the secret managing unit 210, or the secret managing unit 310.

The non-transitory computer-readable medium 702 includes instructions 724 to send, by the file broker, the training content to the training content platform using the access key for uploading the training content thereof. The non-transitory computer-readable medium 702 includes instructions 726 to transmit, by the training content platform to the file broker, an acknowledgement indicative of receipt of the training content by the training content platform.

The non-transitory computer-readable medium 702 includes instructions 728 to update, by the file broker, a status of the uploading of the training content in a database corresponding to the file broker. The status may be indicative of the receipt of the training content by the training content platform.

In response to presence of the malware in the training content, the non-transitory computer-readable medium 702 includes instructions to refrain, by the file broker, from fetching the access key for the training content platform corresponding to the tenant from the secret managing unit. Further, the non-transitory computer-readable medium 702 includes instructions to update, by the file broker, a status message indicative of the presence of the malware in the training content in the database corresponding to the file broker.

The non-transitory computer-readable medium 702 includes instructions to determine, by the file broker, whether the tenant that has raised the request is an authorized tenant of the TMP based on identity information corresponding to each of the plurality of tenants of the TMP maintained in a keycloak unit. The keycloak unit may correspond to the keycloak unit 108, the keycloak unit 208, or the keycloak unit 308. The non-transitory computer-readable medium 702 includes instructions to receive, by the tenant of the TMP, the pre-signed URL from the file broker for secure uploading of the training content in response to the determination that the tenant that has raised the request is an authorized tenant of the TMP.

The non-transitory computer-readable medium 702 includes instructions to refrain, by the file broker, from sending the pre-signed URL to the TMP in response to the determination that the tenant that has raised the request is an unauthorized tenant of the TMP. Further, the non-transitory computer-readable medium 702 includes instructions to transmit, by the file broker to the tenant of the TMP, a message indicative of failure of authentication of the request.

In the present subject matter, to mitigate the security risk and DevOps intervention, the file broker is provided as an intermediary between the Salesforce TMP and the Rustici engine. As mentioned earlier, the present subject matter uses the connections managing unit and the keycloak unit to authenticate and authorize Salesforce TMP interaction with the file broker. Therefore, the present subject matter eliminates direct call to the Rustici engine, which would have required sharing the access keys with each of the users. The file broker fetches the access keys from the secret managing unit when interacting with Rustici engine. Therefore, the present subject matter secures access to the access keys only with the file broker. Accordingly, the present subject matter mitigates data security risks by not sharing access keys with each user and mitigates operational risks. The present subject matter ensures secure authentication and authorization taking advantage of existing components. Further, the present subject matter reduces manual onboarding steps for onboarding of the users and additional load on DevOps during onboarding of users. In the present subject matter, the file broker scans the training content uploaded for malware and does not upload the training content to the Rustici engine if there is a malware found in the training content. Accordingly, the present subject matter eliminates data security risks caused to the Rustici engine due to presence of malware. Therefore, the present subject matter eliminates any loss of data, such as the training content, and sensitive information, theft of identity information of the users, and the like.

Although examples and implementations of present subject matter have been described in language specific to structural features and/or methods, it is to be understood that the present subject matter is not necessarily limited to the specific features or methods described. Rather, the specific features and methods are disclosed and explained in the context of a few example implementations of the present subject matter.

What is claimed is:

1. A system for integrating a training content platform with a training management platform, the system comprising:

one or more processors; and at least one memory communicatively coupled to the one or more processors, wherein the memory stores instructions that, when executed by the one or more processors, cause the one or more processors to:

a file broker stored in the at least one memory and configured to act as an intermediary between the training content platform and the training management platform, wherein the training content platform is to manage a training content that is Sharable Content Object Reference Model (SCORM) compliant, and wherein the training management platform is to provide access to the training content to a plurality of tenants, wherein the file broker is configured to:

receive a request from a tenant of the training management platform, the request being indicative of uploading of the training content to the training content platform;

authenticate the request from the tenant of the training management platform;

obtain, from the tenant of the training management platform, the training content in response to a successful authentication of the request;

scan the training content for malware upon obtaining the training content from the training management platform;

fetch, from a secret managing unit stored in the at least one memory, an access key for the training content platform corresponding to the tenant in response to an absence of the malware in the training content; and send the training content to the training content platform using the access key for uploading the training content thereof; and wherein the secret managing unit is configured to store access keys for the training content platform corresponding to each of the plurality of tenants.

2. The system of claim 1, comprising a keycloak unit stored in the at least one memory and configured to store identity information corresponding to each of the plurality of tenants of the training management platform, wherein to authenticate the request, the file broker is further configured to:

determine whether the tenant that has raised the request is an authorized tenant of the training management platform based on the identity information corresponding to each of the plurality of tenants of the training management platform stored in the keycloak unit; and obtain, from the tenant of the training management platform, the training content to be uploaded to the training content platform in response to the determination that the tenant that has raised the request is an authorized tenant of the training management platform.

3. The system of claim 2, wherein the file broker is further configured to:

refrain from obtaining the training content from the training management platform in response to the determination that the tenant that has raised the request is an unauthorized tenant of the training management platform; and transmit, to the tenant of the training management platform, a message indicative of failure of authentication of the request from the tenant of the training management platform.

4. The system of claim 1, comprising a connections management unit stored in the at least one memory and configured to maintain multi-tenant configuration for managing connection of each of the plurality of tenants of the training management platform with the training content platform, wherein the file broker is further configured to:

obtain, from the connections management unit, an authentication token for authenticating the request from the tenant of the training management platform.

5. The system of claim 1, wherein in response to the successful authentication of the request, the file broker is further configured to:

send, to the tenant of the training management platform, a pre-signed Uniform Resource Locator (URL) for secure uploading of the training content; and obtain, from the tenant of the training management platform, the training content on the pre-signed URL.

6. The system of claim 1, wherein the training content platform is a Rustici engine.

7. The system of claim 1, wherein the training management platform is a Salesforce training management platform.

8. The system of claim 1, wherein the training management platform is hosted on a first cloud server, and wherein the training content platform and the system are hosted on a second cloud server.

9. The system of claim 1, wherein in response to presence of the malware in the training content, the file broker is further configured to:

refrain from fetching the access key for the training content platform corresponding to the tenant from the secret managing unit; and update a database corresponding to the file broker, with a status message indicative of presence of the malware in the training content.

10. A method for integrating a training content platform with a training management platform, the method comprising:

transmitting, by a tenant of a plurality of tenants of the training management platform, a request to a file broker, the request being indicative of uploading of a training content to the training content platform, wherein the training content platform is to manage the training content that is Sharable Content Object Reference Model (SCORM) compliant, wherein the training management platform is to provide access to the training content to the plurality of tenants, and wherein the file broker is to act as an intermediary between the training content platform and the training management platform;

authenticating, by the file broker, the request from the tenant of the training management platform in response to receipt of the request from the tenant;

receiving, by the tenant of the training management platform, an acknowledgement from the file broker in response to a successful authentication of the request, the acknowledgement being indicative of the successful authentication of the request;

sending, by the tenant of the training management platform to the file broker, the training content to be uploaded to the training content platform in response to the receipt of the acknowledgement;

determining, by the file broker, if the training content has malware upon receiving the training content from the training management platform;

transmitting, by a secret managing unit to the file broker, an access key for the training content platform corresponding to the tenant upon the determination of absence of the malware in the training content, wherein the secret managing unit is to store access keys for the training content platform corresponding to each of the plurality of tenants; and receiving, by the training content platform from the file broker, the training content, wherein the file broker is to use the access key for sending the training content to the training content platform.

11. The method of claim 10, comprising:

maintaining, by a keycloak unit, identity information corresponding to each of the plurality of tenants of the training management platform;

determining, by the file broker, whether the tenant that has raised the request is an authorized tenant of the training management platform based on the identity information corresponding to each of the plurality of tenants of the training management platform maintained in the keycloak unit; and receiving, by the tenant of the training management platform, the acknowledgement from the file broker in response to the determination that the tenant that has raised the request is an authorized tenant of the training management platform.

12. The method of claim 10, wherein upon receiving the acknowledgement from the file broker in response to the successful authentication of the request, the method comprises:

receiving, by the tenant of the training management platform, a pre-signed Uniform Resource Locator (URL) from the file broker for secure uploading of the training content; and sending, by the tenant of the training management platform to the file broker, the training content on the pre-signed URL.

13. The method of claim 10, comprising:

maintaining, by a connections management unit, multi-tenant configuration for managing connection of each of the plurality of tenants of the training management platform with the training content platform; and sending, by the connections management unit to the file broker, an authentication token for authenticating the request from the tenant of the training management platform.

14. The method of claim 10, wherein the training content platform is a Rustici engine and the training management platform is a Salesforce training management platform.

15. The method of claim 10, comprising:

sending, by the tenant of the training management platform, a message enquiring status of upload of the training content to the training content platform;

authenticating, by the file broker, the message from the tenant of the training management platform;

obtaining, by the file broker from a database corresponding to the file broker, the status of upload of the training content to the training content platform in response to a successful authentication; and receiving, by the tenant of the training management platform, the status of upload of the training content to the training content platform from the file broker.

16. The method of claim 15, wherein in response to a failure of the authentication of the message from the tenant of the training management platform, the method comprises:

refraining, by the file broker, from obtaining the status of upload of the training content to the training content platform.

17. A non-transitory computer-readable medium comprising instructions for integrating a training content platform with a training management platform, the instructions being executable by a processing resource to:

receive, by a file broker, a request from a tenant of a plurality of tenants of the training management platform, the request indicative of uploading of a training content to the training content platform, wherein the training content platform is to manage the training content that is Sharable Content Object Reference Model (SCORM) compliant, wherein the training content platform is a Rustici engine, wherein the training management platform is to provide access to the training content to the plurality of tenants, wherein the training management platform is a Salesforce training management platform, and wherein the file broker to act as an intermediary between the training content platform and the training management platform;

authenticate, by the file broker, the request from the tenant of the training management platform;

receive, by the tenant of the training management platform, a pre-signed Uniform Resource Locator (URL) from the file broker for secure uploading of the training content in response to a successful authentication of the request;

upload, by the tenant of the training management platform, the training content on the pre-signed URL;

scan, by the file broker, the training content for malware;

fetch, from a secret managing unit, an access key for the training content platform corresponding to the tenant in response to an absence of the malware in the training content;

send, by the file broker, the training content to the training content platform using the access key for uploading the training content thereof;

transmit, by the training content platform to the file broker, an acknowledgement indicative of receipt of the training content by the training content platform; and update, by the file broker, a status of the uploading of the training content in a database corresponding to the file broker, wherein the status is indicative of the receipt of the training content by the training content platform.

18. The non-transitory computer-readable medium of claim 17, wherein in response to presence of the malware in the training content, the instructions being executable by the processing resource to:

refrain, by the file broker, from fetching the access key for the training content platform corresponding to the tenant from the secret managing unit; and update, by the file broker, a status message indicative of the presence of the malware in the training content in the database corresponding to the file broker.

19. The non-transitory computer-readable medium of claim 17, the instructions being executable by the processing resource to:

determine, by the file broker, whether the tenant that has raised the request is an authorized tenant of the training management platform based on identity information corresponding to each of the plurality of tenants of the training management platform maintained in a keycloak unit; and receive, by the tenant of the training management platform, the pre-signed URL from the file broker for secure uploading of the training content in response to the determination that the tenant that has raised the request is an authorized tenant of the training management platform.

20. The non-transitory computer-readable medium of claim 19, the instructions being executable by the processing resource to:

refrain, by the file broker, from sending the pre-signed URL to the training management platform in response to the determination that the tenant that has raised the request is an unauthorized tenant of the training management platform; and transmit, by the file broker to the tenant of the training management platform, a message indicative of failure of authentication of the request.

* * * * *